United States Patent
Farcet et al.

(10) Patent No.: US 12,553,842 B2
(45) Date of Patent: Feb. 17, 2026

(54) DETERMINATION OF MODIFICATION DEGREE OF THERAPEUTIC PROTEINS USING 1H-NMR SPECTROSCOPY

(71) Applicant: TAKEDA PHARMACEUTICAL COMPANY LIMITED, Osaka (JP)

(72) Inventors: Jean-Baptiste Farcet, Vienna (AT); Juergen Siekmann, Vienna (AT)

(73) Assignee: Takeda Pharmaceutical Company Limited, Osaka (JP)

(*) Notice: Subject to any disclaimer, the term of this patent is extended or adjusted under 35 U.S.C. 154(b) by 848 days.

(21) Appl. No.: 17/904,153

(22) PCT Filed: Feb. 24, 2021

(86) PCT No.: PCT/JP2021/006782
§ 371 (c)(1),
(2) Date: Aug. 12, 2022

(87) PCT Pub. No.: WO2021/172326
PCT Pub. Date: Sep. 2, 2021

(65) Prior Publication Data
US 2023/0096592 A1   Mar. 30, 2023

Related U.S. Application Data

(60) Provisional application No. 62/980,757, filed on Feb. 24, 2020.

(51) Int. Cl.
*G01N 24/08* (2006.01)
*G01R 33/46* (2006.01)

(52) U.S. Cl.
CPC ....... *G01N 24/088* (2013.01); *G01R 33/4625* (2013.01)

(58) Field of Classification Search
CPC .......................... G01N 24/088; G01N 24/085
USPC ......................................................... 436/173
See application file for complete search history.

(56) References Cited

U.S. PATENT DOCUMENTS

2006/0154323 A1   7/2006   Brown
2015/0231274 A1*  8/2015   Cheng ................... A61K 47/61
                                                  530/322

FOREIGN PATENT DOCUMENTS

WO   WO 2012/108297 A1   8/2012

OTHER PUBLICATIONS

Pezzoli, D. et al, Journal of Drug Delivery Science and Technology 2017, 37, 115-122. (Year: 2017).*
Hanashima, Shinya "NMR Conformational Analysis of α(2-8)Oligo- and Polysialic Acids," Trends in Glycoscience and Glycotechnology. Sep. 2012. vol. 24, No. 139, pp. 228-230.
Ray, G. Joseph, "Complete Structural Elucidation of an Oxidized Polysialic Acid Drug Intermediate by Nuclear Magnetic Resonance Spectroscopy," Bioconjugate Chemistry, 2014, vol. 25, No. 4, pp. 665-676.
Weber, Alfred, et al."Polysialic Acid-Mediated Activity Measurement of Polysialylated Recombinant Coagulation Factor VIII," Journal of Pharmaceutical Sciences, 2019, vol. 1, pp. 996-974.
Zaghmi, Ahlem et al "Determination of the degree of PEGylation of protein bioconjugates using data from proton nuclear magnetic resonance spectroscopy," Data in Brief, 2019, vol. 25, pp. 104037-1 ~104037-7.
Alvares, Rohan D. A. et al. "Quantitative Detection of PEGylated Biomacromolecules in Biological Fluids by NMR", American Chemical Society, 2016, 88, pp. 3730-3738.
Zaghmi, A. "Mechanisms of activity loss for a multi-PEGylated protein by experiment and simulation", Materials Today Chemistry 12, 2019, pp. 121-131.

* cited by examiner

*Primary Examiner* — Arlen Soderquist
(74) *Attorney, Agent, or Firm* — MORGAN, LEWIS & BOCKIUS LLP

(57) ABSTRACT

This invention provides, among other things, methods for determining the average number of first polymers covalently attached to protein-first polymer conjugates in a solution.

21 Claims, 1 Drawing Sheet

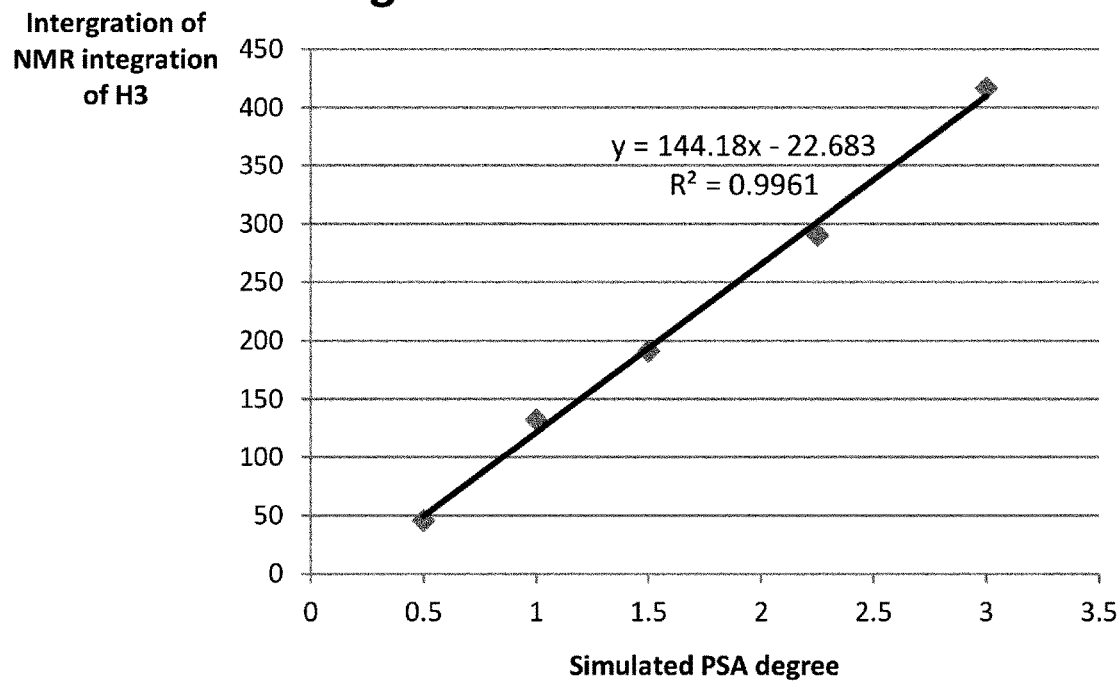

DETERMINATION OF MODIFICATION DEGREE OF THERAPEUTIC PROTEINS USING 1H-NMR SPECTROSCOPY

PRIORITY CLAIM

This application claims benefit to U.S. Provisional Application Ser. No. 62/980,757, filed Feb. 24, 2020, which is incorporated herein by reference in its entirety.

TECHNICAL FIELD

Background Art

Protein modification has been used for many years to increase the pharmacokinetic properties of bioactive molecules. Water soluble polymers, such as polyethylene glycol (PEG), polysialic acid (PSA), dextran, hydroxyethyl starch (HES), and their derivatives bound to the protein can dramatically increase the water solubility of the modified molecules, decrease the immunogenicity due to shielding effects and protect biomolecules against proteolytic enzymes, all of which results in an effective increase of the half-life in vivo. Numerous longer acting therapeutic proteins are on the market, most of them based on PEGylation technology, Turecek et al., J. Pharm. Sci. 2016, 105, 460-475.

One important parameter for the analytical characterization of these conjugates is their modification degree—the number of water-soluble polymers attached to the protein. Obtaining the modification degree of these conjugates is crucial to monitor the industrial production process and to match product quality.

Measurement of the number of polymers attached to a protein in a polymer-protein conjugate (modification degree) Classically, modification degree determination involved at least two or three experimental measurements.

First, the protein concentration in the conjugates in the sample was ascertained. Assays which can determine protein concentration include fluorescent/spectrophotometric assays, Lowry assays, bicinchoninic acid (BCA) assay, Bradford assay, copper ion-based assays, as well as several other UV and colorimetric protein assays.

Second, the water-soluble polymer concentration in the conjugates in the sample was ascertained. The test is dependent of the type of attached polymer, with each polymer having its specific assays. In some assays, the water-soluble polymer concentration is determined by experimentally measuring the total water-soluble polymer in the sample and also experimentally measuring the free water soluble polymer in the sample.

For instance, the concentration of PSA in a protein sample is measured by the Resorcinol assay. In this assay, the polymer is completely hydrolyzed under strong acidic condition, the formation of a colored complex between each monomer and the Resorcinol is monitored by photometric measurement. The final PSA concentration can be determined using calibration curves. A drawback of this assay is that the sample is destroyed in the course of the analysis.

As another example, the concentration of PEG is determined by a HPLC-based method. A drawback of this assay is that the sample is destroyed in the course of the analysis.

Each experimental measurement introduces a degree of error which reduces the precision of the values obtained. These errors can have significant consequences when highly pure pharmaceutical products are sought. A lack of precision in the values obtained can necessitate multiple tests to determine a correct value for release parameters and/or stringent release specifications to ensure the release of conforming product. Due to the more stringent release specifications, desirable batches of products may be discarded unnecessarily. Due to the lack of precision in determining the target level of degree of modification for a protein, optimal conditions for a polymer-protein coupling may be more difficult to determine, and require multiple tests to confirm. So, the lack of precision can also lengthen the time for development of an optimal production process for the polymer-protein conjugate. The lack of precision can also have an influence on the product to be developed.

It would improve quality control analyses in industrial production processes to provide a highly precise modification degree analysis with a reduced number of experimental measurements. This and other advantages are provided by the invention described herein.

SUMMARY OF INVENTION

This invention provides, among other things, methods for determining the average number of first polymers covalently attached to protein-first polymer conjugates in a solution, comprising:
a) performing a $^1$H nuclear magnetic resonance measurement on the solution comprising the protein-first polymer conjugates;
b) processing said $^1$H nuclear magnetic resonance measurement;
c) integrating said $^1$H nuclear magnetic resonance measurement at a first-type proton peak, wherein said first-type proton peak comprises a signal generated by at least one proton on the side chain of at least one amino acid in the protein-first polymer conjugates;
d) calibrating said result of c);
e) integrating said $^1$H nuclear magnetic resonance measurement at a second-type proton peak, wherein said second-type proton peak comprises a signal generated by at least one proton in the first polymers;
f) dividing the result of e) by the number of second-type protons per monomer of the first polymer;
g) dividing the result of f) by the average number of monomers in the first polymer, thereby determining the average number of the first polymers covalently attached to the protein-first polymer conjugates in the solution.

BRIEF DESCRIPTION OF DRAWINGS

FIG. 1 Intergration of NMR integration of H3 vs. PSA degree of rFIX-PSA mixture.

DESCRIPTION OF EMBODIMENTS

Detailed Description of the Invention

I. Definitions and Abbreviations

As used herein, the singular forms "a," "an", and "the" include plural references unless the context clearly dictates otherwise. For example, reference to "an active agent" includes a single active agent as well as two or more different active agents in combination. It is to be understood that present teaching is not limited to the specific dosage forms, carriers, or the like, disclosed herein and as such may vary.

The abbreviations used herein generally have their conventional meaning within the chemical and biological arts.

The term "poly" as used herein means at least 2. For example, a polyvalent metal ion is a metal ion having a valency of at least 2.

"Moiety" refers to a radical of a molecule that is attached to the remainder of the molecule.

The symbol 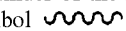
whether utilized as a bond or displayed perpendicular to a bond, indicates the point at which the displayed moiety is attached to the remainder of the molecule.

The phrase "pharmaceutically acceptable" means moieties or compounds that are, within the scope of medical judgment, suitable for use in humans without causing undesirable biological effects such as undue toxicity, irritation, allergic response, and the like, for example.

As used herein, the term "protein" refers to any series of 10 or more covalently linked amino acids which perform a biological function. Protein molecules contemplated include full-length proteins, precursors of full length proteins, biologically active subunits or fragments of full length proteins, as well as biologically active derivatives and variants of any of these forms of proteins. Thus, the term protein includes those that (1) have an amino acid sequence that has greater than about 60%, about 65%, about 70%, about 75%, about 80%, about 85%, about 90%, about 91%, about 92%, about 93%, about 94%, about 95%, about 96%, about 97%, about 98% or about 99% or greater amino acid sequence identity, over a region of at least about 25, about 50, about 100, about 200, about 300, about 400, or more amino acids, to a polypeptide encoded by a referenced nucleic acid or an amino acid sequence described herein; and/or (2) specifically bind to antibodies, e.g., polyclonal or monoclonal antibodies, generated against an immunogen comprising a referenced amino acid sequence as described herein, an immunogenic fragment thereof, and/or a conservatively modified variant thereof.

As used herein "biologically active derivative" or "biologically active variant" includes any derivative or variant of a molecule having substantially the same functional and/or biological properties of said molecule, such as binding properties, and/or the same structural basis, such as a peptidic backbone or a basic polymeric unit.

An "analog," such as a "variant" or a "derivative," is a compound, such as a protein or a first polymer, which is substantially similar in structure and has the same biological activity, albeit in certain instances to a differing degree, to a naturally-occurring molecule. For example, a polypeptide variant refers to a polypeptide sharing substantially similar structure and having the same biological activity as a reference polypeptide. Variants or analogs differ in the composition of their amino acid sequences compared to the naturally-occurring polypeptide from which the analog is derived, based on one or more mutations involving (i) deletion of one or more amino acid residues at one or more termini of the polypeptide and/or one or more internal regions of the naturally-occurring polypeptide sequence (e.g., fragments), (ii) insertion or addition of one or more amino acids at one or more termini (typically an "addition" or "fusion") of the polypeptide and/or one or more internal regions (typically an "insertion") of the naturally-occurring polypeptide sequence or (iii) substitution of one or more amino acids for other amino acids in the naturally-occurring polypeptide sequence. By way of example, a "derivative" is a type of analog and refers to a polypeptide sharing the same or substantially similar structure as a reference polypeptide that has been modified, e.g., chemically.

A variant polypeptide is a type of analog polypeptide and includes insertion variants, wherein one or more amino acid residues are added to a protein amino acid sequence of the invention. Insertions may be located at either or both termini of the protein, and/or may be positioned within internal regions of the protein amino acid sequence. Insertion variants, with additional residues at either or both termini, include for example, fusion proteins and proteins including amino acid tags or other amino acid labels. In one aspect, the blood coagulation protein molecule optionally contains an N-terminal Met, especially when the molecule is expressed recombinantly in a bacterial cell such as *E. coli*.

In deletion variants, one or more amino acid residues in a protein polypeptide as described herein are removed. Deletions can be effected at one or both termini of the protein polypeptide, and/or with removal of one or more residues within the protein amino acid sequence. Deletion variants, therefore, include fragments of a protein polypeptide sequence.

In substitution variants, one or more amino acid residues of a protein polypeptide are removed and replaced with alternative residues. In one aspect, the substitutions are conservative in nature and conservative substitutions of this type are well known in the art. Alternatively, the invention embraces substitutions that are also non-conservative. Exemplary conservative substitutions are described in Lehninger, [Biochemistry, 2nd Edition; Worth Publishers, Inc., New York (1975), pp. 71-77] and are set out immediately below.

| CONSERVATIVE SUBSTITUTIONS | |
|---|---|
| SIDE CHAIN CHARACTERISTIC | AMINO ACID |
| Non-polar (hydrophobic): | |
| A. Aliphatic | A L I V P |
| B. Aromatic | F W |
| C. Sulfur-containing | M |
| D. Borderline | G |
| Uncharged-polar: | |
| A. Hydroxyl | S T Y |
| B. Amides | N Q |
| C. Sulfhydryl | C |
| D. Borderline | G |
| Positively charged (basic) | K R H |
| Negatively charged (acidic) | D E |

Alternatively, exemplary conservative substitutions are set out here.

| CONSERVATIVE SUBSTITUTIONS II | |
|---|---|
| ORIGINAL RESIDUE | EXEMPLARY SUBSTITUTION |
| Ala (A) | Val, Leu, Ile |
| Arg (R) | Lys, Gln, Asn |
| Asn (N) | Gln, His, Lys, Arg |
| Asp (D) | Glu |
| Cys (C) | Ser |
| Gln (Q) | Asn |
| Glu (E) | Asp |
| His (H) | Asn, Gln, Lys, Arg |
| Ile (I) | Leu, Val, Met, Ala, Phe, |
| Leu (L) | Ile, Val, Met, Ala, Phe |
| Lys (K) | Arg, Gln, Asn |
| Met (M) | Leu, Phe, Ile |
| Phe (F) | Leu, Val, Ile, Ala |
| Pro (P) | Gly |
| Ser (S) | Thr |

-continued

| CONSERVATIVE SUBSTITUTIONS II | |
|---|---|
| ORIGINAL RESIDUE | EXEMPLARY SUBSTITUTION |
| Thr (T) | Ser |
| Trp (W) | Tyr |
| Tyr (Y) | Trp, Phe, Thr, Ser |
| Val (V) | Ile, Leu, Met, Phe, Ala |

The present invention may suitably comprise, consist of, or consist essentially of, the elements in the claims, as described herein.

II. Introduction

The invention provides methods of determining the modification degree of a water-soluble polymer protein conjugate through quantitative nuclear magnetic resonance (Q-NMR). Q-NMR determination of the modification degree provides many benefits over classical methods, including at least the following. First, Q-NMR data is acquired in 1 measurement, versus the 2 or more measurements needed in the classical method. Fewer measurements reduce overall error. Second, Q-NMR requires less sample than classical methods, sometimes reducing this requirement by at least 50%. Third, Q-NMR sample preparation is easier than classical method sample preparation. In exemplary embodiments, Q-NMR samples are prepared simply by adding 10% $D_2O$ to the material and transferring it to an NMR tube. Fourth, Q-NMR analysis does not destroy the sample, while classical methods, such as the resorcinol test, destroy the sample. Recovery of the sample is a major Q-NMR analysis benefit. Fifth, Q-NMR measurements are collected in the second/minute time scale, while classical measurements often require hours to collect.

Proton NMR Spectroscopy

Proton Nuclear magnetic resonance ($^1$H-NMR, also called NMR) is a spectroscopic technique that detects the energy absorbed by changes in the nuclear spin state. NMR uses a large magnet to probe the intrinsic spin properties of atomic nuclei. Like all spectroscopies, NMR uses a component of electromagnetic radiation (radio frequency waves) to promote transitions between nuclear energy levels (resonance). NMR is the only spectroscopic technique that has a resonance intensity that is inherently quantitative. Indeed, the NMR resonance attenuation coefficient is identical for all nuclei of a given type and, therefore, does not require calibration with reference materials for each resonance detected. In an exemplary embodiment, the NMR spectroscopy is not 2D-NMR spectroscopy.

Quantitative Proton NMR (Q-NMR):

Q-NMR has been used for many decades, and spectrometers have now reached such a sensitivity that good quantitative data can be obtained routinely.

III. Methods

In an exemplary embodiment, the invention provides a method for determining the average number of first polymers covalently attached to protein-first polymer conjugates in a solution.

The method comprises:
a) performing a $^1$H nuclear magnetic resonance measurement on the solution comprising the protein-first polymer conjugates;
b) processing said $^1$H nuclear magnetic resonance measurement;
c) integrating said $^1$H nuclear magnetic resonance measurement at a first-type proton peak, wherein said first-type proton peak comprises a signal generated by at least one proton on the side chain of at least one amino acid in the protein-first polymer conjugates;
d) calibrating said result of c);
e) integrating said $^1$H nuclear magnetic resonance measurement at a second-type proton peak, wherein said second-type proton peak comprises a signal generated by at least one proton in the first polymers;
f) dividing the result of e) by the number of second-type protons per monomer of the first polymer;
g) dividing the result of f) by the average number of monomers in the first polymer, thereby determining the average number of the first polymers covalently attached to the protein-first polymer conjugates in the solution.

Protein-First Polymer Conjugates

In an exemplary embodiment, the protein in the protein-first polymer conjugate is described herein. In an exemplary embodiment, the protein in the protein-first polymer conjugate is Factor VIII. In an exemplary embodiment, the protein in the protein-first polymer conjugate is full-length Factor VIII. In an exemplary embodiment, the protein in the protein-first polymer conjugate is B-domain deleted Factor VIII. In an exemplary embodiment, the protein in the protein-first polymer conjugate is Factor IX. In an exemplary embodiment, the protein in the protein-first polymer conjugate is Factor VIIa. In an exemplary embodiment, the protein in the protein-first polymer conjugate is von Willebrand Factor. In an exemplary embodiment, the protein in the protein-first polymer conjugate is bovine pancreatic trypsin inhibitor. In an exemplary embodiment, the protein in the protein-first polymer conjugate is albumin. In an exemplary embodiment, the protein in the protein-first polymer conjugate is bovine serum albumin. In an exemplary embodiment, the protein in the protein-first polymer conjugate is human serum albumin. In an exemplary embodiment, the protein in the protein-first polymer conjugate is granulocyte colony stimulating factor (G-CSF). In an exemplary embodiment, the protein in the protein-first polymer conjugate is phenylalanine ammonia-lyase. In an exemplary embodiment, the protein in the protein-first polymer conjugate is adenosine deaminase. In an exemplary embodiment, the protein in the protein-first polymer conjugate is asparaginase. In an exemplary embodiment, the protein in the protein-first polymer conjugate is L-asparaginase. In an exemplary embodiment, the protein in the protein-first polymer conjugate is erythropoietin. In an exemplary embodiment, the protein in the protein-first polymer conjugate is interferon. In an exemplary embodiment, the protein in the protein-first polymer conjugate is interferon alpha-2. In an exemplary embodiment, the protein in the protein-first polymer conjugate is interferon alfa-2a. In an exemplary embodiment, the protein in the protein-first polymer conjugate is interferon alfa-2b. In an exemplary embodiment, the protein in the protein-first polymer conjugate is interferon beta-1a. In an exemplary embodiment, the protein in the protein-first polymer conjugate is a tumor necrosis-factor. In an exemplary embodiment, the protein in the protein-first polymer conjugate is tumor necrosis-factor alpha. In an exemplary embodiment, the protein in the protein-first polymer conjugate is human growth hormone. In an exemplary embodiment, the protein in the protein-first polymer conjugate is uricase.

In an exemplary embodiment, the first polymer in the protein-first polymer conjugate is described herein. In an exemplary embodiment, the first polymer in the protein-first polymer conjugate is polyethylene glycol (PEG). In an exemplary embodiment, the first polymer in the protein-first polymer conjugate is polysialic acid (PSA).

In an exemplary embodiment, the protein-first polymer conjugate is described herein. In an exemplary embodiment, the protein-first polymer conjugate is Factor VIII-PEG. In an exemplary embodiment, the protein-first polymer conjugate is full-length Factor VIII-PEG. In an exemplary embodiment, the protein-first polymer conjugate is B-domain deleted Factor VIII-PEG. In an exemplary embodiment, the protein-first polymer conjugate is Factor IX-PEG. In an exemplary embodiment, the protein-first polymer conjugate is Factor VIIa-PEG. In an exemplary embodiment, the protein-first polymer conjugate is von Willebrand Factor-PEG. In an exemplary embodiment, the protein-first polymer conjugate is bovine pancreatic trypsin inhibitor-PEG. In an exemplary embodiment, the protein-first polymer conjugate is albumin-PEG. In an exemplary embodiment, the protein-first polymer conjugate is bovine serum albumin-PEG. In an exemplary embodiment, the protein-first polymer conjugate is human serum albumin-PEG. In an exemplary embodiment, the protein-first polymer conjugate is granulocyte colony stimulating factor-PEG (G-CSF-PEG). In an exemplary embodiment, the protein-first polymer conjugate is phenylalanine ammonia-lyase-PEG. In an exemplary embodiment, the protein-first polymer conjugate is adenosine deaminase-PEG. In an exemplary embodiment, the protein-first polymer conjugate is asparaginase-PEG. In an exemplary embodiment, the protein-first polymer conjugate is L-asparaginase-PEG. In an exemplary embodiment, the protein-first polymer conjugate is erythropoietin-PEG. In an exemplary embodiment, the protein-first polymer conjugate is interferon-PEG. In an exemplary embodiment, the protein-first polymer conjugate is interferon alpha-2-PEG. In an exemplary embodiment, the protein-first polymer conjugate is interferon alfa-2a-PEG. In an exemplary embodiment, the protein-first polymer conjugate is interferon alfa-2b-PEG. In an exemplary embodiment, the protein-first polymer conjugate is interferon beta-1a-PEG. In an exemplary embodiment, the protein-first polymer conjugate is a tumor necrosis-factor-PEG. In an exemplary embodiment, the protein-first polymer conjugate is tumor necrosis-factor alpha-PEG. In an exemplary embodiment, the protein-first polymer conjugate is human growth hormone-PEG. In an exemplary embodiment, the protein-first polymer conjugate is uricase-PEG.

In an exemplary embodiment, the protein-first polymer conjugate is Factor VIII-PEG. In an exemplary embodiment, the protein-first polymer conjugate is full-length Factor VIII-PSA. In an exemplary embodiment, the protein-first polymer conjugate is B-domain deleted Factor VIII-PSA. In an exemplary embodiment, the protein-first polymer conjugate is Factor IX-PSA. In an exemplary embodiment, the protein-first polymer conjugate is Factor VIIa-PSA. In an exemplary embodiment, the protein-first polymer conjugate is von Willebrand Factor-PSA. In an exemplary embodiment, the protein-first polymer conjugate is bovine pancreatic trypsin inhibitor-PSA. In an exemplary embodiment, the protein-first polymer conjugate is albumin-PSA. In an exemplary embodiment, the protein-first polymer conjugate is bovine serum albumin-PSA. In an exemplary embodiment, the protein-first polymer conjugate is human serum albumin-PSA. In an exemplary embodiment, the protein-first polymer conjugate is granulocyte colony stimulating factor-PSA (G-CSF-PSA). In an exemplary embodiment, the protein-first polymer conjugate is phenylalanine ammonia-lyase-PSA. In an exemplary embodiment, the protein-first polymer conjugate is adenosine deaminase-PSA. In an exemplary embodiment, the protein-first polymer conjugate is asparaginase-PSA. In an exemplary embodiment, the protein-first polymer conjugate is L-asparaginase-PSA. In an exemplary embodiment, the protein-first polymer conjugate is erythropoietin-PSA. In an exemplary embodiment, the protein-first polymer conjugate is interferon-PSA. In an exemplary embodiment, the protein-first polymer conjugate is interferon alpha-2-PSA. In an exemplary embodiment, the protein-first polymer conjugate is interferon alfa-2a-PSA. In an exemplary embodiment, the protein-first polymer conjugate is interferon alfa-2b-PSA. In an exemplary embodiment, the protein-first polymer conjugate is interferon beta-1a-PSA. In an exemplary embodiment, the protein-first polymer conjugate is a tumor necrosis-factor-PSA. In an exemplary embodiment, the protein-first polymer conjugate is tumor necrosis-factor alpha-PSA. In an exemplary embodiment, the protein-first polymer conjugate is human growth hormone-PSA. In an exemplary embodiment, the protein-first polymer conjugate is uricase-PSA.

a) Performing a $^1$H Nuclear Magnetic Resonance Measurement

In an exemplary embodiment, a solution is provided in which a protein-first polymer conjugate is dissolved. The time required to perform the $^1$H nuclear magnetic resonance measurement is roughly proportional to the concentration of the protein-first polymer conjugate in the solution. In other words, the total measurement time for a dilute protein-first polymer conjugate solution can be longer than for a more concentrated protein-first polymer conjugate solution. A solution that is too dilute may not yield an acceptable signal-to-noise ratio within a reasonable total measurement time. In an exemplary embodiment, the signal-to-noise ratio for the solution is greater than 1.0. In an exemplary embodiment, the signal-to-noise ratio for the solution is between 1.0 and 20. In an exemplary embodiment, the signal-to-noise ratio for the solution is greater than 2.0. In an exemplary embodiment, the signal-to-noise ratio for the solution is between 2.0 and 20. In an exemplary embodiment, the signal-to-noise ratio for the solution is greater than 2.5. In an exemplary embodiment, the signal-to-noise ratio for the solution is between 2.5 and 20. In an exemplary embodiment, the signal-to-noise ratio for the solution is greater than 2.8. In an exemplary embodiment, the signal-to-noise ratio for the solution is between 2.8 and 20. In an exemplary embodiment, the signal-to-noise ratio for the solution is greater than 3.0. In an exemplary embodiment, the signal-to-noise ratio for the solution is between 3.0 and 20. In an exemplary embodiment, the signal-to-noise ratio for the solution is greater than 3.2. In an exemplary embodiment, the signal-to-noise ratio for the solution is between 3.2 and 20. In an exemplary embodiment, the signal-to-noise ratio for the solution is greater than 3.4. In an exemplary embodiment, the signal-to-noise ratio for the solution is between 3.4 and 20. In an exemplary embodiment, the signal-to-noise ratio for the solution is greater than 3.8. In an exemplary embodiment, the signal-to-noise ratio for the solution is between 3.8 and 20. In an exemplary embodiment, the signal-to-noise ratio for the solution is greater than 4.0. In an exemplary embodiment, the signal-to-noise ratio for the solution is between 4.0 and 20. In an exemplary embodiment, the signal-to-noise ratio for the solution is greater than 4.5. In an exemplary embodiment, the signal-to-noise ratio for the solution is between 4.5 and 20. In an exemplary embodiment, the signal-to-noise ratio for the solution is greater than 5.0. In an exemplary embodiment, the signal-to-noise ratio for the solution is between 5.0 and 20. In an exemplary embodiment, the signal-to-noise ratio for the solution is greater than 6.0. In an exemplary embodiment, the signal-to-noise ratio for the solution is between 6.0 and 20. In an exemplary embodiment, the signal-to-noise ratio for the solution is greater than 7.0. In an exemplary embodiment, the signal-to-noise ratio for the solution is between 7.0 and 20. In an exemplary embodiment, the signal-to-noise ratio for the solution is greater than 8.0. In an exemplary embodiment, the signal-to-noise ratio for the solution is between 8.0 and 20. In an exemplary embodiment, the signal-to-noise ratio for the solution is greater than 9.0. In an exemplary embodiment, the signal-to-noise ratio for the solution is between 9.0 and 20. In an exemplary embodiment, the signal-to-noise ratio for the solution is greater than 10. In an exemplary embodiment, the signal-to-noise ratio for the solution is between 10 and 20. The signal-to-noise ratio can be calculated as the base of peak height ratio in the spectrum.

In an exemplary embodiment, the protein-first polymer conjugate concentration in the solution is between about 0.01 mg/mL–about 10 mg/mL. In an exemplary embodiment, the protein-first polymer conjugate concentration in the solution is between about 0.01 mg/mL–about 0.1 mg/mL. In an exemplary embodiment, the protein-first polymer conjugate concentration in the solution is between about 0.1 mg/mL–about 1 mg/mL. In an exemplary embodiment, the protein-first polymer conjugate concentration in the solution is between about 1 mg/mL–about 10 mg/mL. In an exemplary embodiment, the protein-first polymer conjugate concentration in the solution is between about 0.01 mg/mL–about 1 mg/mL. In an exemplary embodiment, the protein-first polymer conjugate concentration in the solution is between about 0.1 mg/mL–about 10 mg/mL. In an exemplary embodiment, the protein-first polymer conjugate concentration in the solution is between about 0.08 mg/mL–about 0.3 mg/mL. In an exemplary embodiment, the protein-first polymer conjugate concentration in the solution is between about 0.15 mg/mL–about 0.5 mg/mL. In an exemplary embodiment, the protein-first polymer conjugate concentration in the solution is between about 0.25 mg/mL–about 0.75 mg/mL. In an exemplary embodiment, the protein-first polymer conjugate concentration in the solution is between about 0.33 mg/mL–about 1.0 mg/mL. In an exemplary embodiment, the protein-first polymer conjugate concentration in the solution is between about 0.2 mg/mL–about 0.6 mg/mL. In an exemplary embodiment, the protein-first polymer conjugate concentration in the solution is between about 0.3 mg/mL–about 0.65 mg/mL. In an exemplary embodiment, the protein-first polymer conjugate concentration in the solution is between about 0.5 mg/mL–about 1.0 mg/mL. In an exemplary embodiment, the protein-first polymer conjugate concentration in the solution is between about 0.65 mg/mL–about 1.2 mg/mL. In an exemplary embodiment, the protein-first polymer conjugate concentration in the solution is between about 0.45 mg/mL–about 0.9 mg/mL.

In an exemplary embodiment, the protein-first polymer conjugate has been purified from the reaction mixture in which it was synthesized, so as to remove materials such as unconjugated first polymer. In an exemplary embodiment, the protein-first polymer conjugate solution has been purified. In an exemplary embodiment, the protein-first polymer conjugate has been purified from the reaction mixture in which it was synthesized prior to performing a $^1$H nuclear magnetic resonance measurement. In an exemplary embodiment, the purification is a member selected from the group consisting of ion exchange chromatography, size exclusion chromatography, affinity chromatography, ultrafiltration, diafiltration, hydrophilic interaction chromatography, normal-phase chromatography, reverse-phase chromatography, and simulated moving-bed chromatography.

The solution in which a protein-first polymer conjugate is dissolved is a liquid which is capable of dissolving the amount of protein-first polymer conjugate provided. Examples of solvents suitable for dissolving protein-first polymer conjugates include deuterated solvents. Examples of deuterated solvents include $D_2O$, MeOD, and deuterated DMSO. In an exemplary embodiment, the solvent is between about 1% $D_2O$ and about 99.9% $D_2O$. In an exemplary embodiment, the solvent is between about 1% to about 99.9% of a deuterated solvent selected from $D_2O$, MeOD, deuterated DMSO, and combinations thereof. In an exemplary embodiment, the solvent is between about 1% $D_2O$ and about 10% $D_2O$. In an exemplary embodiment, the solvent is between about 1% to about 10% of a deuterated solvent selected from $D_2O$, MeOD, deuterated DMSO, and combinations thereof. In an exemplary embodiment, the solvent is between about 9% $D_2O$ and about 20% $D_2O$. In an exemplary embodiment, the solvent is between about 9% to about 20% of a deuterated solvent selected from $D_2O$, MeOD, deuterated DMSO, and combinations thereof. In an exemplary embodiment, the solvent is between about 19% $D_2O$ and about 30% $D_2O$. In an exemplary embodiment, the solvent is between about 19% to about 30% of a deuterated solvent selected from $D_2O$, MeOD, deuterated DMSO, and combinations thereof. In an exemplary embodiment, the solvent is between about 29% $D_2O$ and about 40% $D_2O$. In an exemplary embodiment, the solvent is between about 29% to about 40% of a deuterated solvent selected from $D_2O$, MeOD, deuterated DMSO, and combinations thereof. In an exemplary embodiment, the solvent is between about 39% $D_2O$ and about 50% $D_2O$. In an exemplary embodiment, the solvent is between about 39% to about 50% of a deuterated solvent selected from $D_2O$, MeOD, deuterated DMSO, and combinations thereof. In an exemplary embodiment, the solvent is between about 49% $D_2O$ and about 60% $D_2O$. In an exemplary embodiment, the solvent is between about 49% to about 60% of a deuterated solvent selected from $D_2O$, MeOD, deuterated DMSO, and combinations thereof. In an exemplary embodiment, the solvent is between about 59% $D_2O$ and about 70% $D_2O$. In an exemplary embodiment, the solvent is between about 59% to about 70% of a deuterated solvent selected from $D_2O$, MeOD, deuterated DMSO, and combinations thereof. In an exemplary embodiment, the solvent is between about 69% $D_2O$ and about 80% $D_2O$. In an exemplary embodiment, the solvent is between about 69% to about 80% of a deuterated solvent selected from $D_2O$, MeOD, deuterated DMSO, and combinations thereof. In an exemplary embodiment, the solvent is between about 79% $D_2O$ and about 90% $D_2O$. In an exemplary embodiment, the solvent is between about 79% to about 90% of a deuterated solvent selected from $D_2O$, MeOD, deuterated DMSO, and combinations thereof. In an exemplary embodiment, the solvent is between about 89% $D_2O$ and about 99% $D_2O$. In an exemplary embodiment, the solvent is between about 89% to about 99% of a deuterated solvent selected from $D_2O$, MeOD, deuterated DMSO, and combinations thereof. For any of the embodiments in this paragraph, the remaining solvent is $H_2O$. In an exemplary embodiment, the solvent is between about 7% to about 13% $D_2O$, with the remainder of the solvent contributed by $H_2O$. For any of the embodiments in this paragraph, the amount of deuterated solvent also includes MeOD or deuterated DMSO; for example, solvent is $H_2O$. In an exemplary embodiment, additional components are present in the solution. In an exemplary embodiment, the additional component is used for calibration purposes, such as tetramethylsilane, 3-(trimethylsilyl)-1-propanesulfonic acid sodium salt (DSS), 3-(trimethylsilyl)propionic-2,2,3,3-$d_4$ acid sodium salt (TMSP-$d_4$), or octamethylcyclotetrasiloxane ($D_4$). In an exemplary embodiment, the additional component can aid in maintaining the protein-first polymer conjugate in a dissolved state in the solution, such as for example MeOD or deuterated DMSO. These additional components would have protons which would not interfere with the collection of data on the first-type proton peak or the second-type proton peak. In an exemplary embodiment, the protein-first polymer conjugate concentration in the solution is about 1 mg/mL.

In an exemplary embodiment, the solution is provided in a NMR tube. In an exemplary embodiment, the quality of the $^1H$ nuclear magnetic resonance measurement is proportional to the diameter of the NMR tube. In an exemplary embodiment, a solution in a NMR tube with a small diameter is measured for a longer time period than the same sample in a NMR tube with a large diameter. Standard NMR tube have a diameter of about 5 mm. NMR tubes with larger diameters require greater sample volumes.

In an exemplary embodiment, the NMR tube has a diameter of between about 1 mm and about 20 mm. In an exemplary embodiment, the NMR tube has a diameter of between about 1 mm and about 10 mm. In an exemplary embodiment, the NMR tube has a diameter of between about 3 mm and about 7 mm. In an exemplary embodiment, the NMR tube has a diameter of about 5 mm.

In an exemplary embodiment, the NMR tube is a standard size. In an exemplary embodiment, the NMR tube has O.D.×I.D. of 5 mm×4.2 mm. In an exemplary embodiment, the NMR tube has a length of between about 5 inches and about 9 inches. In an exemplary embodiment, the NMR tube has a length of about 7 in.

In an exemplary embodiment, the solution is introduced into a machine capable of conducting nuclear magnetic resonance measurements. In an exemplary embodiment, the NMR machine manufacturer is Bruker. NMR machines which can be utilized in this invention are described on the Bruker website: https://www.bruker.com/en/products-and-solutions/magnetic-resonance.html. Additional NMR machine manufacturers can include Agilent Technologies (Varian NMR spectrometers), Anasazi Instruments (https://www.aiinmr.com), Jeol (https://www.jeol.co.jp/en/products/category_nmr.html), Magritek (https://magritek.com), Nanalysis (https://www.nanalysis.com), Oxford Instruments: (https://nmr.oxinst.com), Qonetec (http://www.qonetec.com/spectrometers), and ThermoFisher Scientific (https://www.thermofisher.com/at/en/home/industrial/spectroscopy-elemental-isotopeanalysis/molecular-spectroscopy/nuclear-magnetic-resonance-nmr.html). NMR machines of use in the invention have a magnetic strength of between about 60 MHz and about 1.5 GHz, or between about 200 MHz and about 700 MHz, or between about 300 MHz and about 600 MHz, or about 300 MHz, or about 600 MHz. In an exemplary embodiment the measuring time for the NMR machine is between about 1 second and about 10 hours. In an exemplary embodiment, the measuring time is between about 1 second and 1 minute, or between about 1 minute and 10 minutes, or between about 10 minutes and 30 minutes, or between about 30 minutes and about 1 hour, or between about 1 hour and 2 hours, or between about 2 hours and about 5 hours, or between about 5 hours and about 10 hours. In general, the longer the measuring time, the better the signal-to-noise ratio, which can provide a more accurate measurement. One of skill in the art will be able to alter the measurement parameters to fit the specifics of the spectrometer available to them. Using a high field spectrometer may however reduce the measuring time and increase the signal-to-noise ratio (S/N).

In an exemplary embodiment, the $^1H$ nuclear magnetic resonance measurement is performed on the solution in the NMR tube. Several acquisition parameters to be considered when performing the $^1H$ nuclear magnetic resonance measurements include recycle delay, pulse sequence, pulse width, # of scans and temperature. Processing parameters such as baseline correction, integral manipulation, digitalization or deconvolution are also parameters that can be optimized.

Examples of acquisition parameters include
recycle delay;
Recycle delay is the time for the spin of an atom to reset; it is a waiting time. Recycle delay is commonly named d1 and appears at the beginning of the pulse sequence, in practice, this delay comes after the acquisition time. The nuclear spins do not instantly return to equilibrium, not allowing enough time for relaxation between pulses will cause varied attenuation of the signals and inaccurate integration. In an exemplary embodiment, the measurement is performed with a recycle delay of from about 0.1 second to about 1 minute. In an exemplary embodiment, the measurement is performed with a recycle delay of from about 1 second to about 10 minutes. In an exemplary embodiment, the measurement is performed with a recycle delay of from about 0.5 second to about 1.5 seconds. In an exemplary embodiment, the measurement is performed with a recycle delay of from about 1 second to about 5 seconds. In an exemplary embodiment, the measurement is performed with a recycle delay of from about 4 seconds to about 30 seconds. In an exemplary embodiment, the measurement is performed with a recycle delay of from about 10 seconds to about 20 seconds. In an exemplary embodiment, the measurement is performed with a recycle delay of from about 13 seconds to about 17 seconds. In an exemplary embodiment, the measurement is performed with a recycle delay of from about 1 second to about 20 seconds.

# of scans;
In an exemplary embodiment, the measurement is performed with from about 10 scans to about 10,000 scans. In an exemplary embodiment, the measurement is performed with from about 10 scans to about 30 scans. In an exemplary embodiment, the measurement is performed with from about 90 scans to about 400 scans. In an exemplary embodiment, the measurement is performed with from about 200 scans to about 400 scans. In an exemplary embodiment, the measurement is performed with from about 2750 scans to about 325 scans. In an exemplary embodiment, the measurement is performed with from about 390 scans to about 1000 scans. In an exemplary embodiment, the measurement is performed with from about 990 scans to about 2000 scans. In an exemplary embodiment, the measurement is performed with from about 1300 scans to about 1700 scans. In an exemplary embodiment, the measurement is performed with from about 1990 scans to about 4000 scans. In an exemplary embodiment, the measurement is performed with from about 2700 scans to about 3300 scans. In an exemplary embodiment, the measurement is performed with from about 3990 scans to about 6000 scans. In an exemplary embodiment, the measurement is performed with from about 5990 scans to about 10,000 scans.

total measurement time;

The total measurement time is dependent of the number of scans and the time of the pulse sequence. In an exemplary embodiment, the measurement is performed from about 0.1 second to about 12 hours. In an exemplary embodiment, the measurement is performed from about 0.1 second to about 3 hours. In an exemplary embodiment, the measurement is performed from about 0.25 hours to about 4 hours. In an exemplary embodiment, the measurement is performed from about 0.25 hours to about 1.5 hours. In an exemplary embodiment, the measurement is performed from about 1.5 hours to about 4 hours. In an exemplary embodiment, the measurement is performed from about 1 hour to about 3 hours. In an exemplary embodiment, the measurement is performed from about 1 hour to about 2 hours. In an exemplary embodiment, the measurement is performed from about 1.5 hours to about 3.5 hours. In an exemplary embodiment, the measurement is performed from about 1 second to about 2 hours. In an exemplary embodiment, the measurement is performed from about 10 seconds to about 1 hour. In an exemplary embodiment, the measurement is performed from about 1 minute to about 50 minutes. In an exemplary embodiment, the measurement is performed from about 10 minutes to about 45 minutes.

temperature;

Temperature will affect the relaxing time of the sample as well as the chemical shifts. In an exemplary embodiment, the measurement is performed from about −10° C. to about 100° C. In an exemplary embodiment, the measurement is performed from about 1° C. to about 90° C. In an exemplary embodiment, the measurement is performed from about 1° C. to about 40° C. In an exemplary embodiment, the measurement is performed from about 5° C. to about 35° C. In an exemplary embodiment, the measurement is performed from about 10° C. to about 30° C. In an exemplary embodiment, the measurement is performed from about 15° C. to about 25° C. In an exemplary embodiment, the measurement is performed from about 20° C. to about 30° C. In an exemplary embodiment, the measurement is performed from about 20° C. to about 25° C.

the pulse sequence;

The pulse sequence is a succession of pulse signals, waiting and acquisition times that can be repeated a number of times to improve the S/N ratio. In an exemplary embodiment, the pulse sequence utilized adequately suppresses the contribution to the signal from $H_2O$. In an exemplary embodiment, the pulse sequence is Bruker pulse sequence "zgesgp". In an exemplary embodiment, the pulse sequence uses excitation sculpting. In an exemplary embodiment, the pulse sequence uses a gradient ratio of gp1:gp2=31:11 with z-gradients only. In an exemplary embodiment, the pulse sequence uses relaxation delays of from about 1 sec to about 15 sec. In an exemplary embodiment, the pulse sequence is found in T.-L. Hwang, A. J. Shaka, J. Magn. Reson., Ser. A, 112, 275-279 (1995), which is incorporated by reference herein in its entirety for all purposes.

pulse width;

Application of a pulse sequence at the appropriate frequency will rotate the bulk magnetization of the nuclear spins by a specific angle. Pulses are generally described by this angle of rotation. The angle of rotation is dependent on the width of the pulse. The pulse width is entered in microseconds. In an exemplary embodiment, the pulse width is from about 0.10 ms to about 200 ms. In an exemplary embodiment, the pulse width is from about 100 ms to about 200 ms. In an exemplary embodiment, the pulse width is from about 0.9 ms to about 100 ms. In an exemplary embodiment, the pulse width is from about 1 ms to about 110 ms. In an exemplary embodiment, the pulse width is from about 0.9 ms to about 10 ms. In an exemplary embodiment, the pulse width is from about 2 ms to about 50 ms. In an exemplary embodiment, the pulse width is from about 5 ms to about 40 ms. In an exemplary embodiment, the pulse width is from about 25 ms to about 75 ms. In an exemplary embodiment, the pulse width is from about 25 ms to about 150 ms. In an exemplary embodiment, the pulse width is from about 40 ms to 180 ms.

spectral width;

In an exemplary embodiment, the measurement is performed at a spectral width of from about −4 ppm to about +10 ppm. In an exemplary embodiment, the measurement is performed at a spectral width of from about +1 ppm to about +20 ppm. In an exemplary embodiment, the measurement is performed at a spectral width of from about −1 ppm to about +8 ppm. In an exemplary embodiment, the measurement is performed at a spectral width of from about +1 ppm to about +10 ppm.

receiver gain;

The NMR receiver gain is a parameter that is often chosen to maximize the signal to noise ratio. For optimum sensitivity, a dilute analyte needs to be observed with a high NMR receiver gain and the strong, interfering solvent signal has to be suppressed. In an exemplary embodiment, the measurement is performed without optimized receiver gain. In an exemplary embodiment, the measurement is performed with optimized receiver gain.

b) Processing

In an exemplary embodiment, the data acquired in the NMR measurement is processed. In an exemplary embodiment, processing includes one or more of the following: Fourier transform, phasing, baseline correction, zero filling, peak picking, multiplet analysis, integral manipulations, digitalization, and deconvolution.

Fourier transform;

In NMR, a Fourier transform is carried out to extract the frequency-domain spectrum from the raw time-domain FID. A spectrum from a single FID can have a low signal-to-noise ratio, but may improve readily with averaging of repeated acquisitions. In an exemplary embodiment, the measurement is processed with Fourier transform.

phasing;

In high resolution NMR the peaks are needed as narrow and symmetric as possible. This is equivalent to say that the signals in the FID must be in phase with the instrument receiver. Phasing involves both zero-order and often first-order adjustment. Zero-order (PH0) phase is the same across the spectrum for all peaks. First-order (PH1) is applied to peaks by a linearly changing amount starting from a "pivot" point where the 1st-order phase adjustment is zero.

baseline correction;

In $^1H$ NMR spectra there can be baseline artifacts which might adversely affect the identification and quantification of NMR resonances. Baseline correction algorithms can be applied to a $^1H$ nuclear magnetic resonance measurement, ranging from manual to fully automatic methods. In an exemplary embodiment, the baseline correction is manual. In an exemplary embodiment, the baseline correction is automatic.

zero filling;

Zero filling involves adding zeros (sometimes many) to the FID to enhance digital resolution of the FT spectrum.

peak picking;

Peak picking involves selecting a peak and displaying its chemical shift.

integral manipulation;

The integrated intensity of a signal in a $^1$H NMR spectrum gives a ratio for the number of hydrogens that give rise to the signal, thus facilitating the calculation of the total number of hydrogens present in a sample. While a single signal can be calibrated with a value given by the operator manually the other integrals are proportionally and automatically calculated.

digitalization:

In an exemplary embodiment, the data acquired in the NMR measurement is digitalized. In an exemplary embodiment, the data acquired in the NMR measurement is not digitalized.

deconvolution:

In an exemplary embodiment, the data acquired in the NMR measurement is deconvoluted. In an exemplary embodiment, the data acquired in the NMR measurement is not deconvoluted.

In an exemplary embodiment, the measurement is processed with automatic phase correction. In an exemplary embodiment, the measurement is processed with automatic baseline correction. In an exemplary embodiment, the measurement is processed with a line broadening window function of from about 0.01 to 10 Hz. In an exemplary embodiment, the measurement is processed with an exponential methods window function. In an exemplary embodiment, the measurement is processed with a DSS axis calibration.

c) Integrating the Protein Peak

In an exemplary embodiment, a first-type proton peak is integrated. Any proton peak generated by a proton on an amino acid in the protein may be selected. In an exemplary embodiment, the amino acid proton peak does not overlap with a proton peak generated by a proton on a solvent molecule. In an exemplary embodiment, the amino acid proton peak does not overlap with a proton peak generated by a proton on a first polymer. As used herein, 'does not overlap' means that the signal between two peaks returns to baseline, or returns to within 2%, ow within 5%, or within 7%, or within 10%, or baseline.

In an exemplary embodiment, a first-type proton peak is of a first-type proton on at least one amino acid on a protein. In an exemplary embodiment, the protein has a molecular weight of from about 1 kDa to about 10 kDa. In an exemplary embodiment, the protein has a molecular weight of from about 5 kDa to about 15 kDa. In an exemplary embodiment, the protein has a molecular weight of from about 10 kDa to about 35 kDa. In an exemplary embodiment, the protein has a molecular weight of from about 20 kDa to about 60 kDa. In an exemplary embodiment, the protein has a molecular weight of from about 30 kDa to about 70 kDa. In an exemplary embodiment, the protein has a molecular weight of from about 50 kDa to about 250 kDa. In an exemplary embodiment, the protein has a molecular weight of from about 200 kDa to about 500 kDa. In an exemplary embodiment, the protein has a molecular weight of from about 450 kDa to about 1,000 kDa. In an exemplary embodiment, the protein has a molecular weight of from about 900 kDa to about 4,000 kDa. In an exemplary embodiment, the protein has a molecular weight of from about 3,000 kDa to about 10,000 kDa. In an exemplary embodiment, the protein has a molecular weight of from about 9,000 kDa to about 20,000 kDa. In an exemplary embodiment, the protein has a molecular weight of from about 500 kDa to about 20,000 kDa. In an exemplary embodiment, a first-type proton is on at least one amino acid of a blood coagulation protein. In an exemplary embodiment, the blood coagulation protein has biological activity selected from the group consisting of Factor II, Factor III, Factor V, Factor VII, Factor VIIa, Factor VIII, Factor IX, Factor X, Factor XI, Factor XII, Factor XIII, von Willebrand Factor, protein C, antithrombin III, thrombin (FII), protein S, tPA, PAI-1, tissue factor (TF) and ADAMTS 13 protease. In an exemplary embodiment, the protein has Factor VIIa biological activity. In an exemplary embodiment, the protein has Factor VIII biological activity. In an exemplary embodiment, the protein has Factor IX biological activity. In an exemplary embodiment, the protein has human serum albumin biological activity.

In an exemplary embodiment, a first-type proton peak is generated by a first-type proton on one amino acid of the protein in the protein-first polymer conjugate. Any proton peak contributed by a proton on at least one amino acid of the protein in the protein-first polymer conjugate may be selected. In an exemplary embodiment, the first-type proton peak comprises those generated by a first-type proton on more than one amino acid of the protein in the protein-first polymer conjugate. In an exemplary embodiment, the first-type proton peak is generated by a first-type proton on two or three or four or five amino acids of the protein in the protein-first polymer conjugate. In an exemplary embodiment, the first-type proton peak is generated by at least one proton on the side chain of alanine of the protein in the protein-first polymer conjugate. In an exemplary embodiment, the first-type proton peak is generated by at least one proton on the side chain of valine of the protein in the protein-first polymer conjugate. In an exemplary embodiment, the first-type proton peak comprises those generated by at least one proton on the side chain of leucine of the protein in the protein-first polymer conjugate. In an exemplary embodiment, the first-type proton peak comprises those generated by at least one proton on the side chain of isoleucine of the protein in the protein-first polymer conjugate. In an exemplary embodiment, the first-type proton peak comprises those generated by at least one proton on the side chain of tryptophan of the protein in the protein-first polymer conjugate. In an exemplary embodiment, the first-type proton peak comprises those generated by at least one proton on the side chain of histidine of the protein in the protein-first polymer conjugate.

In an exemplary embodiment, the first-type proton peak comprises those generated by at least one proton on the side chain of valine of the protein in the protein-first polymer conjugate and at least one proton on the side chain of leucine of the protein in the protein-first polymer conjugate. In an exemplary embodiment, the first-type proton peak comprises those generated by at least one proton on the side chain of valine of the protein in the protein-first polymer conjugate and at least one proton on the side chain of isoleucine of the protein in the protein-first polymer conjugate. In an exemplary embodiment, the first-type proton peak comprises those generated by at least one proton on the side chain of leucine of the protein in the protein-first polymer conjugate and at least one proton on the side chain of isoleucine of the protein in the protein-first polymer conjugate. In an exemplary embodiment, the first-type proton peak comprises those generated by at least one proton on the side chain of valine of the protein in the protein-first polymer conjugate, at least one proton on the side chain of leucine of the protein in the protein-first polymer conjugate, and at least one proton on the side chain of isoleucine of the protein in the protein-first polymer conjugate.

In an exemplary embodiment, the integration is fixed. In an exemplary embodiment, the integration is centered.

d) Calibrating

In an exemplary embodiment, the calibrating comprises equating the result of c) with the number of first-type protons in the protein-first polymer conjugate.

In an exemplary embodiment, the protein in the protein-first polymer conjugate is Factor VIII. In an exemplary embodiment, the protein in the protein-first polymer conjugate is full-length Factor VIII. In an exemplary embodiment, the protein in the protein-first polymer conjugate is B-domain deleted Factor VIII. In an exemplary embodiment, the protein in the protein-first polymer conjugate is Factor IX. In an exemplary embodiment, the protein in the protein-first polymer conjugate is Factor VIIa. In an exemplary embodiment, the protein in the protein-first polymer conjugate is von Willebrand Factor. In an exemplary embodiment, the protein in the protein-first polymer conjugate is granulocyte colony stimulating factor (G-CSF). In an exemplary embodiment, the protein in the protein-first polymer conjugate is phenylalanine ammonia-lyase. In an exemplary embodiment, the protein in the protein-first polymer conjugate is adenosine deaminase. In an exemplary embodiment, the protein in the protein-first polymer conjugate is asparaginase. In an exemplary embodiment, the protein in the protein-first polymer conjugate is L-asparaginase. In an exemplary embodiment, the protein in the protein-first polymer conjugate is erythropoietin. In an exemplary embodiment, the protein in the protein-first polymer conjugate is interferon. In an exemplary embodiment, the protein in the protein-first polymer conjugate is interferon alpha-2. In an exemplary embodiment, the protein in the protein-first polymer conjugate is interferon alfa-2a. In an exemplary embodiment, the protein in the protein-first polymer conjugate is interferon alfa-2b. In an exemplary embodiment, the protein in the protein-first polymer conjugate is interferon beta-1a. In an exemplary embodiment, the protein in the protein-first polymer conjugate is a tumor necrosis-factor. In an exemplary embodiment, the protein in the protein-first polymer conjugate is tumor necrosis-factor alpha. In an exemplary embodiment, the protein in the protein-first polymer conjugate is human growth hormone. In an exemplary embodiment, the protein in the protein-first polymer conjugate is uricase. For any of the proteins described in this paragraph, the first-type proton peak comprises those generated by at least one proton on the side chain of valine. For any of the proteins described in this paragraph, the first-type proton peak comprises those generated by at least one proton on the side chain of leucine. For any of the proteins described in this paragraph, the first-type proton peak comprises those generated by at least one proton on the side chain of isoleucine. For any of the proteins described in this paragraph, the first-type proton peak comprises those generated by at least one proton on the side chain of tryptophan. For any of the proteins described in this paragraph, the first-type proton peak comprises those generated by at least one proton on the side chain of valine, at least one proton on the side chain of leucine, and at least one proton on the side chain of isoleucine.

Valine has 2 equivalent methyl groups attached to the β-carbon, which corresponds to 6 protons being NMR-equivalent (i.e., having the same electronic environment). Valine has also 1 proton attached to the β-carbon and 1 proton attached to the α-carbon.

Leucine has 2 equivalent methyl groups attached to the γ-carbon, which corresponds to 6 protons being NMR-equivalent (i.e., having the same electronic environment). Leucine has 1 proton attached to the γ-carbon, 2 protons attached to the β-carbon and 1 proton attached to the α-carbon.

Isoleucine has 3 protons attached to the δ-carbon, 2 protons attached to the γ-carbon, 2 protons attached to the β-carbon and 1 proton attached to the α-carbon.

Tryptophan has a characteristic and unique proton (N—H) around 11 ppm that could also be used for the internal calibration.

Examples of determining the number of first-type protons in the protein of the first polymer conjugate are found in Example A6, Example B7 part b), Example C7, Example C8, Example D3, and Example E.

Because we calibrate the results with a reference sample for which the structure is known, or using a calibration curve, the value of the integral of the first-type protons can be chosen arbitrarily, as long as the value stays constant between the reference sample measurement and the protein-first polymer conjugate solution measurement. The values of the integrals of the NMR spectra would however not reflect the numbers of the corresponding protons in the molecules of the NMR sample. Whether 6 or 7 is selected as the number of first-type protons in the amino acid isoleucine does not impact the results obtained. It will have an effect on the $K_{NMR}$ factor that is used to accommodate the shift between the value of the integral and the real value of the modification degree of the reference sample(s). The number of first-type protons (around 1 ppm) of amino acids can be used to calibrate the value of the $^1$H-NMR integrals. If the correct number of these protons are used, the other integrals of other peaks will also correspond to the correct number of the corresponding protons in the molecules of the NMR sample (and $K_{NMR}$ will be close to 1).

e) Integrating First Polymer Peak

In an exemplary embodiment, a second-type proton peak is integrated. Any proton peak contributed by a proton on a first polymer may be selected. In an exemplary embodiment, the first polymer proton peak does not overlap with a proton peak generated by a proton on a solvent molecule. In an exemplary embodiment, the first polymer proton peak does not overlap with a proton peak generated by a proton on a protein.

In an exemplary embodiment, the first polymer is selected from the group consisting of polyalkylene glycol, polysaccharides, polyalkylene glycol (PAG), polyoxazoline, polyacryloylmorpholine, polyvinyl alcohol (PVA), polycarboxylate, polyvinylpyrrolidone, polyphosphazene, polyoxazoline, polyethylene-co-maleic acid anhydride, polystyrene-co-maleic acid anhydride, and poly(1-hydroxymethylethylene hydroxymethylformal) (PHF). In an exemplary embodiment, the first polymer is selected from the group consisting of polyethylene glycol (PEG), polypropylene glycol (PPG), polyoxazoline, polyacryloylmorpholine, polyvinyl alcohol (PVA), polycarboxylate, polyvinylpyrrolidone, polyphosphazene, polyoxazoline, polyethyleneco-maleic acid anhydride, polystyrene-co-maleic acid anhydride, and poly(1-hydroxymethylethylene hydroxymethylformal) (PHF). In an exemplary embodiment, the first polymer is selected from the group consisting of polysialic acid (PSA), pullulane, chitosan, hyaluronic acid, chondroitin sulfate, dermatan sulfate, starch, dextran, and carboxymethyl-dextran. In an exemplary embodiment, the first polymer is selected from the group consisting of HES (Hydroxyethyl starch), poly(ethylene oxide) (PEO), polyoxyethylene (POE), polyvinyl alcohol, hydroxyethyl cellulose, and dextran.

In an exemplary embodiment, the first polymer comprises polysialic acid. In another exemplary embodiment, the first polymer is polysialic acid. In an exemplary embodiment, the first polymer comprises (α-2,8) polysialic acid. In another exemplary embodiment, the first polymer is (α-2,8) polysialic acid. In an exemplary embodiment, the first polymer comprises (α-2,9) polysialic acid. In another exemplary embodiment, the first polymer is (α-2,9) polysialic acid. In an exemplary embodiment, the first polymer comprises (α-2,8) and (α-2,9) polysialic acid. In another exemplary embodiment, the first polymer is (α-2,8) and (α-2,9) polysialic acid.

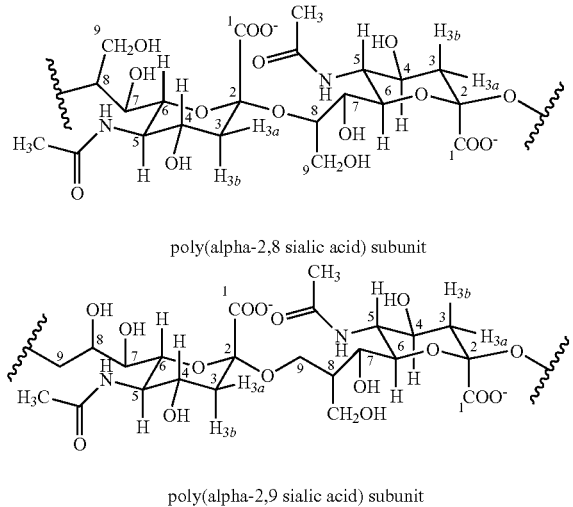

poly(alpha-2,8 sialic acid) subunit poly(alpha-2,9 sialic acid) subunit

In an exemplary embodiment, the first polymer comprises polysialic acid and polyethylene glycol. In another exemplary embodiment, the first polymer is polysialic acid and polyethylene glycol. In an exemplary embodiment, the first polymer comprises (α-2,8) polysialic acid and polyethylene glycol. In another exemplary embodiment, the first polymer is (α-2,8) polysialic acid and polyethylene glycol. In an exemplary embodiment, the first polymer comprises (α-2,9) polysialic acid and polyethylene glycol. In another exemplary embodiment, the first polymer is (α-2,9) polysialic acid and polyethylene glycol. In an exemplary embodiment, the first polymer comprises (α-2,8) and (α-2,9) polysialic acid and polyethylene glycol. In another exemplary embodiment, the first polymer is (α-2,8) and (α-2,9) polysialic acid and polyethylene glycol.

In an exemplary embodiment, the first polymer comprises a polysialic acid described herein, and the second-type proton peak is generated from protons on the sialic acid moieties of the polysialic acid. In an exemplary embodiment, the first polymer comprises polysialic acid described herein, and the second-type proton peak is generated from a proton selected from the group consisting of $H_{3a}$, $H_{3b}$, $H_4$, $H_5$, and $H_6$. In an exemplary embodiment, the first polymer comprises polysialic acid described herein, and the second-type proton peak is generated from a proton selected from $H_{3a}$ or $H_{3b}$. In an exemplary embodiment, the first polymer comprises polysialic acid described herein, and the second-type proton peak is generated from $H_{3a}$.

In an exemplary embodiment, the first polymer comprises (α-2,8) polysialic acid, and the second-type proton peak is generated from protons on the sialic acid moieties on the (α-2,8) polysialic acid. In an exemplary embodiment, the first polymer comprises (α-2,8) polysialic acid, and the second-type proton peak is generated from a proton selected from the group consisting of $H_{3a}$, $H_{3b}$, $H_4$, $H_5$, and $H_6$ on the (α-2,8) polysialic acid. In an exemplary embodiment, the first polymer comprises (α-2,8) polysialic acid, and the second-type proton peak is generated from a proton selected from $H_{3a}$ or $H_{3b}$ on the (α-2,8) polysialic acid. In an exemplary embodiment, the first polymer comprises (α-2,8) polysialic acid, and the second-type proton peak is generated from $H_{3a}$ on the (α-2,8) polysialic acid.

In an exemplary embodiment, the first polymer comprises (α-2,8) polysialic acid and polyethylene glycol, and the second-type proton peak is generated from protons on the (α-2,8) polysialic acid. In an exemplary embodiment, the first polymer comprises (α-2,8) polysialic acid and polyethylene glycol, and the second-type proton peak is generated from a proton selected from the group consisting of $H_{3a}$, $H_{3b}$, $H_4$, $H_5$, and $H_6$ on the (α-2,8) polysialic acid. In an exemplary embodiment, the first polymer comprises (α-2,8) polysialic acid and polyethylene glycol, and the second-type proton peak is generated from a proton selected from $H_{3a}$ or $H_{3b}$ on the (α-2,8) polysialic acid. In an exemplary embodiment, the first polymer comprises (α-2,8) polysialic acid and polyethylene glycol, and the second-type proton peak is generated from $H_{3a}$ on the (α-2,8) polysialic acid.

In an exemplary embodiment, the first polymer comprises polyethylene glycol. In another exemplary embodiment, the first polymer is polyethylene glycol.

In an exemplary embodiment, the first polymer comprises polyethylene glycol, and the second-type proton peak is on an ethylene moiety.

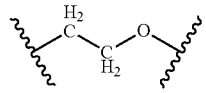

In an exemplary embodiment, the first polymer has a molecular weight of from about 10 kDa to about 110 kDa. In an exemplary embodiment, the first polymer has a molecular weight of from about 1 kDa to about 11 kDa. In an exemplary embodiment, the first polymer has a molecular weight of from about 9 kDa to about 21 kDa. In an exemplary embodiment, the first polymer has a molecular weight of from about 19 kDa to about 31 kDa. In an exemplary embodiment, the first polymer has a molecular weight of from about 29 kDa to about 41 kDa. In an exemplary embodiment, the first polymer has a molecular weight of from about 39 kDa to about 51 kDa. In an exemplary embodiment, the first polymer has a molecular weight of from about 49 kDa to about 61 kDa. In an exemplary embodiment, the first polymer has a molecular weight of from about 59 kDa to about 71 kDa. In an exemplary embodiment, the first polymer has a molecular weight of from about 69 kDa to about 81 kDa. In an exemplary embodiment, the first polymer has a molecular weight of from about 79 kDa to about 91 kDa. In an exemplary embodiment, the first polymer has a molecular weight of from about 89 kDa to about 101 kDa. In an exemplary embodiment, the first polymer has a molecular weight of from about 99 kDa to about 111 kDa.

f) Dividing

In an exemplary embodiment, the result of step e) is divided by the number of second-type protons per monomer of the first polymer. In an exemplary embodiment, the second-type proton peak is divided by the number of second-type protons per monomer of the first polymer. In an exemplary embodiment, the number of monomers in the first polymer is ascertained by this calculation.

In an exemplary embodiment, the first polymer comprises a polysialic acid described herein, and the second-type proton peak is generated by a sialic acid proton described herein. In an exemplary embodiment, the first polymer is an (α-2,8) polysialic acid and polyethylene glycol described herein, and the second-type proton peak is generated by the $H_3$, proton on the (α-2,8) polysialic acid.

In an exemplary embodiment, the first polymer is a polyethylene glycol described herein, and the second-type proton peak is generated by an ethylene proton described herein.

g) Dividing

In an exemplary embodiment, the result of step f) is divided by the average number of monomers in the first polymer. In an exemplary embodiment, the number of monomers in the first polymer is divided by the number of second-type protons per monomer of the first polymer. In an exemplary embodiment, the number of the first polymer covalently attached to the protein-first polymer conjugate is ascertained.

IIIa. Additional Embodiments

For absolute quantification (measurement of the absolute purity of a material) a known weight of a reference material is generally added to a known weight of the analyte in the appropriate solvent. Relative quantification is another very common way to get a ratio between 2 analytes in the same sample. Integration of one peak that is assigned to one of the components is compared to the integration of another peak that is assigned to other component, and after taking in account the number of hydrogen atoms for each peak a molar ratio of the 2 compounds is obtained.

IIIb. $K_{NMR}$

In the industrial-scale production of protein-first polymer conjugates, variability exists in the molecular weight of the proteins, as well as in the molecular weight of the first polymers. In addition, in the use of the NMR techniques, there might be minor signals from other solution components (protein, solvent, impurities) within the first-type proton peak or second-type proton peak. In an exemplary embodiment, to account for this variability, a correction factor can be applied to the calculations described herein. The correction factor is known as $K_{NMR}$. In an exemplary embodiment, the result of e) is divided by $K_{NMR}$. In an exemplary embodiment, the result of f) is divided by $K_{NMR}$. In an exemplary embodiment, the result of g) is divided by $K_{NMR}$.

$K_{NMR}$ can be calculated according to one of several methods.

IIIb. i) $K_{NMR}$ Standard Reference

'C' Examples

In an exemplary embodiment, the numbers of Valine, Leucine and Isoleucine residues present on the protein are multiplied by the numbers of first-type protons (signal: 1 ppm or less) they each contain to obtain the total number of first-type protons (signal: 1 ppm or less) in the protein. The protein multiplet around 1 ppm is integrated using the automated baseline correction and the integral is calibrated to have the value of the total number of first-type protons (signal: 1 ppm or less). In an exemplary embodiment, the integral of the second type proton is set and the peak is integrated using the integration command with automated baseline correction. In an exemplary embodiment, the value of this integral is multiplied by the molecular weight of one polymer unit and divided by the molecular weight of each polymer chain, which is equivalent of dividing by the average numbers of repeating units of each polymer chain. In an exemplary embodiment, the result is divided by the polymer degree of the sample obtained by the classical assay.

IIIb. ii) $K_{NMR}$ Calibration Curve

'A' Examples

In an exemplary embodiment, a calibration curve is generated. In an exemplary embodiment, the calibration curve is obtained by generating NMR measurements for a series of solutions, wherein each solution contains the same but known amount of protein, and a different but known amount of the first polymer. The slope of the curve generated from the series of solutions can be used as $K_{NMR}$, while taking into account the number of protons per first polymer chain. For example, if the polymer chain is PSA with an average polymer chain length of 69, and the second-type proton peak is generated by $H_{ad}$, then $K_{NMR}$=slope/69 (69 $H_{3a}$ protons per PSA chain).

In an exemplary embodiment, $K_{NMR}$ is measured by a calibration curve of 5 samples containing the same amount of rFIX and a different but known amount of PSA (not bond to the protein) was made. The fact that the PSA used (native PSA, oxoPSA or PSA oxime) is not bound to the protein does not interfere with the measurement, as the electronic environment of each proton is only change to such an extent that no change of the shift of the protons is expected.

IIIb. iii) $K_{NMR}$ Alternate Assay

'B' Examples

If the classical method has been used to determine the modification degree (MD) of several samples, but no standard sample is available, the $K_{NMR}$ can be calculated for the several samples and an average can be taken to yield a $K_{NMR}$. The B Examples demonstrate this with good accordance between the classical and NMR methods (RSD is less than 5%).

IV. Comparison of Classical Method with NMR Method

Quantification of the modification degree is crucial in order to monitor the industrial production process and to match product specification. However, tests, such as Resorcinol assay in combination with fluorescent test (which are used for determination of the PSA-degree in PSA-rFVIII) suffer from large imprecision (approximately ±15%), which lead to great difficulties trying to avoid out of specifications batches during product development, production and life cycle management. $^1$H NMR spectrometry can be used to determine the modification degree of proteins in a much reliable fashion leading to a substantial improvement of the method's precision (±5%). By integration of a protein area of the NMR spectra, where the identity and numbers of the protons is known, and by co-integration of a signal specific to the water soluble polymer, we can deduce the ratio protein/polymer and therefore the modification degree. For instance, first-type signals from Valine, Leucine and Isoleucine can be used as an internal calibration reference for the integration, knowing the numbers of these amino acids from the primary structure of the protein, the internal reference integration value can be set to the corresponding value.

Subsequently, a water soluble polymer specific proton signal can be integrated. The modification degree can be calculated by dividing the value of this second integral by the number of protons resulting in this specific signal per chain (=number of repeating units if only one proton per repeating units yield the specific polymer signal). A correcting factor ($K_{NMR}$) can be advantageous to match the real modification degree and balance the overlapping of peaks.

IVa. Adynovate

One example of a PEGylated FVIII product is Adynovate/Adynovi, the longer acting rFVIII product produced by Takeda. Adynovate is manufactured by covalent coupling of a branched 20 kDa PEG reagent from Nektar Therapeutics using N-hydroxysuccinimide (NHS) chemistry to Advate, the full length rFVIII product produced by Takeda.

IVb. PSA-rFVIII

Another example for a longer acting FVIII is the polysialylated rFVIII. PSA is a linear homo-polymer composed of N-acetylneuraminic acid (2-keto-5-acetamido-3,5-dideoxy-D-glycero-D-galacto-nonulo-pyranos-1-onic acid) monomers. Sialic acids are usually found as α-glycosides occupying the termini of hetero-oligosaccharides in glycoconjugates such as glycoproteins or glycolipids, and thus are ubiquitous compounds in most biological tissues. Furthermore, this polysaccharide is susceptible to selective oxidation of the vicinal diols at the nonreducing end. This feature allows a functionalization of PSA and as a consequence enables its use for the chemical modification of therapeutic proteins such as coagulation factors. In PSA-rFVIII the PSA degree is determined by a combination of a fluorescent assay to assess the protein concentration as well as a Resorcinol test to quantify the total PSA. Specifically for this product high inaccuracies arises (approximately ±15%) regarding the modification degree, which lead to great difficulties trying to avoid out of specifications batches during product development, production and life cycle management.

The invention is further illustrated by the Examples that follow. The Examples are not intended to define or limit the scope of the invention.

EXAMPLES

The following Examples illustrate the synthesis of representative compounds used in the invention and the following Reference Examples illustrate the synthesis of intermediates in their preparation. These examples are not intended, nor are they to be construed, as limiting the scope of the invention. It will be clear that the invention may be practiced otherwise than as particularly described herein. Numerous modifications and variations of the invention are possible in view of the teachings herein and, therefore, are within the scope of the invention.

In the examples below, unless otherwise indicated, all temperatures are set forth in degrees Celsius and all parts and percentages are by weight. Reagents may be purchased from commercial suppliers, such as Sigma-Aldrich Chemical Company, and may be used without further purification unless otherwise indicated. Reagents may also be prepared following standard literature procedures known to those skilled in the art. Solvents may be purchased from Sigma-Aldrich in Sure-Seal bottles and used as received. All solvents may be purified using standard methods known to those skilled in the art, unless otherwise indicated. The reactions set forth below were run generally at ambient temperature, unless otherwise indicated. Proton magnetic resonance ($^1$HNMR) spectra were recorded using an NMR spectrometer operating at 600 MHz field strength. Chemical shifts are reported in the form of delta (δ) values given in parts per million (ppm) relative to an internal standard, such as tetramethylsilane (TMS). Alternatively, $^1$H NMR spectra were referenced using the spectrum reference (SR) frequency value of a DSS sample after calibration at 0.00 ppm of its methyl signal for samples in $D_2O/H_2O$. Peak multiplicities are designated as follows: s, singlet; d, doublet; dd, doublet of doublets; t, triplet; dt, doublet of triplets; q, quartet; br, broadened; and m, multiplet. Coupling constants are given in Hertz (Hz).

Starting materials used were either available from commercial sources or prepared according to literature procedures and had experimental data in accordance with those reported.

A Examples demonstrate the use of the NMR method on a protein-first polymer conjugate sample when enough of the non conjugated protein is available to establish a calibration curve. PSA-FIX is the protein-first polymer conjugate in this set of examples.

B Examples demonstrate the use of the NMR method when not enough of the non conjugated protein is available to establish a calibration curve. Here, the investigator has several conjugate protein samples. The modification degree for these protein-first polymer conjugate samples have been assessed by a classical method and a polymer degree value is available. After measuring the NMR spectra of these samples the investigator chose the convenient $K_{NMR}$ factor that match the results of both methods within the range of the polymer degree of the sample set. This method allows the investigator to 'translate' the results from the classical method to the NMR method. PSA-rFVIII is the protein-first polymer conjugate in this set of examples.

C Examples demonstrate the use of the NMR method in yet another situation when not enough of the non conjugated protein is available to establish a calibration curve. Here, the investigator has one protein-first polymer conjugate sample, and the modification degree for this protein-first polymer conjugate has been assessed by the NMR method. PEG-HSA is the conjugate in this set of examples.

D Example describes the use of the NMR method to determine the PEGylation degree in a sample of PEG-rFVIII conjugates.

E Example describes the use of the NMR method to determine the PEGylation degree in a sample of PEG-bovine pancreatic trypsin inhibitor (BPTI) conjugates.

F Example describes the use of the NMR method to determine the PEGylation degree in a sample of PEG-rFIX conjugates.

Example A1

Production of PSA-rFIX Conjugate

PSA-rFIX was prepared as described in U.S. Pat. No. 8,809,501 B2 (Example 11).

25 mg of FXI (V=4.63 mL) was placed in a 50 mL vial. Coupling buffer (V=13.73 mL, 20 mM Histidine, 5 mM $CaCl_2$), 50 mM NaCl, pH 6) was added and the mixture was stirred at ambient temperature. Aminooxy-PSA reagent (55.7 mg, V=1.39 mL, MW 20.5 kDa) were added followed by m-toluidine solution (5 mL, 50 mM) and $NaIO_4$ solution (250 µL, 10 mM). The pH of the reaction was adjusted at 6.0. After completion of the reaction, the reaction was stopped using a L-cysteine solution (256 µL, 1 M). The conjugate was purified using a Strong Anion Exchange Chromatography and Hydrophobic Interaction Chromatography (HIC).

Example A2: Classical Method-Determination of Total rFIX Concentration Using the Bradford Assay The Coomassie (Bradford) Protein Assay is a quantitative assay that was used to determine total rFIX concentration (conjugated and unconjugated) in samples from production and purification steps. This type of assay was first published by Bradford in 1976 (Anal. Biochem 72, 248-254).

The assay was performed at a reference standard concentration range of 5-50 µg/mL. For this assay solutions with standard concentrations of 5, 7, 10, 20, 39, 40 and 50 µg/mL were prepared by dilution of a PSA-rFIX reference standard with $H_2O$. The assay was performed by mixing of 800 µL sample with 200 µL Bradford reagent (BIORAD). The mixture was incubated for 5 to maximal 60 min at a temperature of 20-25° C. agitated again directly before measurement. The extinction coefficient of the solutions (sample and reference standard) were measured versus a blank solution (800 µL $H_2O$+200 µL reagent) in a spectrophotometer at a wavelength of 596 nm. The absorbance data at 595 nm (y-axis) was plotted as a function of the concentration in µg/mL. The resulting curves were fitted by using a 4-parameter curve fit and the total rFIX concentration in the samples containing PSA-rFIX conjugates were calculated.

Total rFIX Concentration was determined by the Bradford assay to be 2.38 mg/mL.

Example A3: Classical Method—Determination of Total PSA Concentration Using the Resorcinol Assay The resorcinol assay was performed as described by Svennerholm in 1957 (Biochimica et Biophysica Acta, 24, 604-611). This assay is based on the following principle:

NANA + HCl + Resorcinol + Cu(II) ⟶ colored complex (blue)

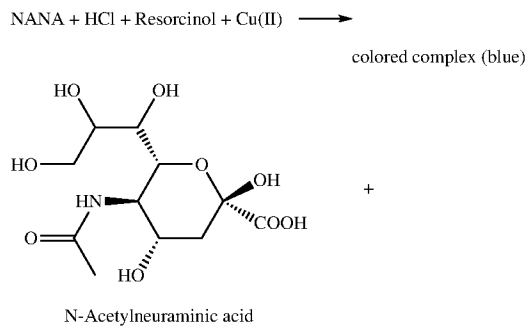

N-Acetylneuraminic acid

-continued

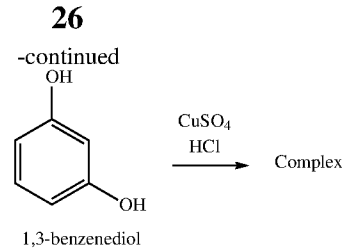

1,3-benzenediol

N-Acetylneuraminic acid (pyranose form) (NANA) was transformed in the presence of concentrated hydrochloric acid to the furanose form and dehydrated rapidly to a furfural. This furfural formed a blue colored complex with resorcinol (1, 3 benzendiol) in the presence of Cu (II) ions. This was shaken out in an organic solvent (butyl acetate/butanol) and is measured at 585 nm photometrically. The absorption of the blue colour complex was proportional to the concentration of the N-acetylneuraminic acid (NANA).

For determination of the total PSA content in a preparation of polysialylated rFIX (PSA-rFIX) a reagent solution was prepared by mixing of a 20 mL aqueous resorcinol solution with 500 µL of an aqueous solution of $CuSO_4×5 H_2O$ (concentration 0.1 M). Then 37% hydrochloric acid was added to get a final volume of 200 mL.

The measuring range of the assay was 10 µg/mL to 100 µg/mL. For the reference curve five different concentrations of NANA in $H_2O$ were prepared (10, 25, 50, 75, 100 µg/mL). 400 µL of each sample (PSA-rFIX sample and reference sample) were intensively mixed with 400 µL of the resorcinol reagent. Then the samples were incubated in a thermomixer for 40 min at 99° C. and 450 rpm and cooled down for 10 minutes at a temperature of −15° C. or less. For extraction of the colored complex 800 µL of an organic extraction solution was added and intensively mixed. This solution was centrifuged at 13,000 rpm for 5 min. The upper organic phase was separated and transferred to a 1 mL cuvette. Then the extinctions were measured at 585 nm in a spectrophotometer and the concentration of total PSA was calculated from the reference curve. All measurements were performed in duplicate.

Total PSA Concentration was determined by the Resorcinol assay to be 1.43 mg/mL.

Example A4: Classical Method-Calculation of PSA Modification Degree for a PSA-rFIX Conjugate Sample The PSA Modification Degree for a PSA-rFIX conjugate is described using the formula:

$$PSA\ MD = \frac{n\ PSA}{n\ rFIX} = \frac{[Total\ PSA]}{MW\ PSA} \times \frac{MW\ rFIX}{[Total\ rFIX]}$$

Based on the data obtained with the assays described above, and with the molecular weight of rFIX as 55 kDa, and the molecular weight of PSA as 20.5 kDa, the PSA modification degree for the PSA-rFIX conjugate is:

$$PSA\ MD = \frac{n\ PSA}{n\ rFIX} = \frac{[1.43\ mg/mL]}{20,500\ Da} \times \frac{55,000\ Da}{[2.38\ mg/mL]}$$

By the Classical Method, the PSA Modification Degree for the PSA-rFIX conjugate for the unknown sample was determined to be 1.61 mol PSA/mol rFIX.

Example A5: Q-NMR Method: Acquisition and Processing

An aqueous sample of PSA-FIX (0.5 mL, 1 mg/mL) in a 2 mL vial was defrosted by standing at RT over 30 min. The sample was transferred with a Pasteur pipette into a 5 mm NMR tube. 56 μL of $D_2O$ (99.9 atom % D) were added to the NMR tube and the content was homogenized by shaking the tube after sealing it with a polyethylene cap. Eventual bubbles were removed by gentle knockings or short immersion in an ultra sound bath. The NMR tube was cleaned and placed in a NMR spinner according to the spectrometer supplier's specifications.

Acquisition Parameters

The proton NMR spectra was acquired on a 600 MHz AVANCE BRUKER spectrometer as follow:
- Spectrometer Frequency: 600 MHz
- Pulse Program: zgesgp;
- Temperature (° C.): 25±5;
- Number of scans: 3000
- SW (ppm): >14 (approximately +10 to −4);
- Receiver Gain: optimize
- D1 (sec): 1

Processing Parameters

The proton-NMR spectra was processed using BRUKER Topspin software V3.5 as follows:
- Window functions: EM (Line broadening: 0.3 Hz);
- The following commands were executed:
- ft: Fourier transform
- apk: automatic phase correction
- abs: automatic baseline correction
- Axis calibration: Spectrum reference frequency was matched with a DSS SR value after calibration at 0.00 ppm of the methyl signal.

Example A6: Obtaining $K_{NMR}$ Through Calibration Curves 5 samples of rFIX (exactly about 0.5 mL, each containing exactly about 0.5 mg of protein) were mixed with different amount of oxo-PSA 20 kDa (alternatively NatPSA or PSA oxime 20 kDa can be used). In Sample 1, 0.5 equivalent (=0.5×n rFIX) of PSA chain was added to the protein, in Sample 2, 1 equivalent (=1×n rFIX) of PSA chain was added to the protein, in Sample 3, 1.5 equivalents (=1.5×n rFIX) of PSA chain were added to the protein, in Sample 4, 2.25 equivalents (=2.25×n rFIX) of PSA chain were added to the protein, in Sample 5, 3 equivalents (=3×n rFIX) of PSA chain were added to the protein. The results are provided in Table 1.

TABLE 1

| Calibration curve | Sample 1 | Sample 2 | Sample 3 | Sample 4 | Sample 5 |
|---|---|---|---|---|---|
| Equivalent of PSA chain | 0.5 | 1 | 1.5 | 2.25 | 3.0 |

The proton NMR spectrum of each sample was acquired according to the parameters listed in EXAMPLE A5.

The numbers of Valine, Leucine and Isoleucine residues present on the protein were multiplied by the numbers of first-type protons (signal: 1 ppm or less, of the amino acid V, L and I) they each contain. In the case of rFIX:

Valine: 35 residues×6 first-type protons=210 H

Leucine: 21 residues×6 first-type protons=126 H

Isoleucine: 22 residues×7 first-type protons=154 H

There are a total of 490 first-type protons in this protein.

The internal calibration of the protein multiplet in the range of approximately 1.05 to 0.6 ppm was set at the value of 490 using the integration command with automated baseline correction.

The integration of the PSA H3a (equatorial) was performed as follows:

The center of the peak was determined (approximately 2.65 ppm) (It appeared as a doublet) and the peak is integrated ±0.04 ppm on each side of the peak center using the integration command with automated baseline correction.

For each spectrum the integration of the H3a peak (at approximately 2.65 ppm) was measured after internal calibration of the protein multiplet in the range of approximately 1.05 to 0.6 ppm. The results are provided in Table 2.

TABLE 2

| Calibration curve | Sample 1 | Sample 2 | Sample 3 | Sample 4 | Sample 5 |
|---|---|---|---|---|---|
| Integral H3a peak | 45.58 | 132.48 | 191.09 | 290.22 | 416.73 |

A calibration curve can be drawn and a correlation between the theoretical PSA degree and the value of the integral of the signal H3a can be established (FIG. 1). $K_{NMR}$ can be determined by dividing the slope of the calibration curve by the number of units in the polymer chain. 20 kDa was the average molecular weight of the PSA polymer utilized in the conjugate. There are approximately 69 sialic acid units in a 20 kDa PSA chain.

$K_{NMR}$=144.18/69=2.09.

Example A7: Q-NMR Determination of the PSA Modification Degree for a PSA-rFIX Conjugate Sample The PSA modification degree of a full-length FIX preparation based on the recombinant product Rixubis (Windyga et al., Ther. Adv. Hematol. 2014, 5, 168-180) was determined by use of $^1$H-NMR technology.

An unknown sample of PSA-rFIX conjugate was measured by NMR. The integration was performed using the integration command with automated baseline correction. According to EXAMPLE A5, the proton NMR spectrum of the sample was acquired and the integration of the $H_{ad}$ peak (approximately 2.65 ppm) was measured after internal calibration of the protein multiplet in the range of approximately 1.05 to 0.6 ppm at the value of 490 using the integration command with automated baseline correction.

The integral of the PSA $H_{3a}$ (equatorial) was set. It appeared as a doublet. The center of the peak was determined (approximately 2.65 ppm) and the peak was integrated ±0.04 ppm on each side of the peak center using the integration command with automated baseline correction.

Integration of $H_{3a}$ peak=196.12

The calibration curve from Example A6 was determined to be $$y=144.18x-22.683$$

wherein y is the integration of a second proton, and x is the PSA Modification Degree for this PSA-rFIX conjugate sample. The $H_{3a}$ peak integration (196.12) was chosen as the second type proton. By the Q-NMR Method, the PSA modification degree (x) on rFIX for the unknown sample was determined to be 1.52 mol PSA/mol rFIX.

Example A8: Determination of Relative Precision of Q-NMR Method in Determining the PSA Modification Degree in a PSA-FIX Conjugate By the Classical Method, the PSA modification degree on rFIX for the unknown sample was determined to be 1.61 mol PSA/mol rFIX.

By the Q-NMR Method, the PSA modification degree on rFIX for the unknown sample was determined to be 1.52 mol PSA/mol rFIX.

The Relative Precision of the Q-NMR Method in Determining the PSA Modification Degree in a PSA-FIX Conjugate is:

$$1.52/1.6=0.95$$

These results are in accordance ±5%. The Q-NMR method has the advantages of requiring only one measurement of the sample which does not destroy the protein-first polymer conjugate. The classical method requires more than one measurement and also destroys the protein-first polymer conjugate in the meantime.

Example B1

Production of PSA-rFVIII Conjugate 1706.30 mg of FVIII (V=407.31 mL) was placed in a 2 L reactor. Coupling puffer (V=1143.95 mL, 20 mM Histidine, 5 mM $CaCl_2$), 50 mM NaCl, pH 6) was added and the mixture was stirred at ambient temperature. Aminooxy-PSA reagent (6459.32 mg, V=165.2 mL, MW 20 kDa) were added followed by m-toluidine solution (308.11 mL, 50 mM) and $NaIO_4$ solution (15.40 mL, 40 mM). The pH of the reaction was adjusted at 6.0. After completion of the reaction (120 min), the reaction was stopped using a L-cysteine solution (30.3 mL, 1 M) and incubated for 60 min. The conjugate was purified using HIC and SEC chromatography followed by an ultra-filtration (UF) step to yield 793.9 g of bulk drug substance (BDS) (1.3 mg FVIII/mL).

One lot was divided into two and was used in Examples B2-B5. A separate lot was prepared for Examples B6-B7. A separate lot was prepared for Examples B8-B10. A separate lot was prepared for Examples B11-B12. A separate lot was prepared for Example B13. A separate lot was prepared for Example B14.

For the classical method described in Examples B2 and B3, PSA-rFVIII conjugates were produced in six separate reactions. Each of the reaction products were labeled A-F. Each of samples A-F were further divided in two. One of the two split samples was subjected to fluorescence testing according to Example B2. The other split sample was subjected to resorcinol testing according to Example B3. The MDs were calculated in Example B4. The (relative) precision of this classical method was then examined in Example B5.

For the Q-NMR method described in Examples B6-B8, PSA-rFVIII conjugates were produced in six separate reactions. Each of the reaction products were labeled 1-6. The MDs were calculated in Example B4. The (relative) precision of this classical method was then examined in Example B5.

Example B2: Classical Method—Determination of Total rFVIII Concentration Using a Fluorescent Assay Due to the high purity of FVIII total protein measurement equals FVIII protein concentration. The determination of the total FVIII protein content in PSA-rFVIII was performed by spectrophotometry. The analysis was based on the intrinsic fluorescence, emitted by aromatic amino acids such as tryptophan, tyrosine and phenylalanine, measured at 350 nm. The intensity of FVIII fluorescence was proportional to its concentration. In order to uniformly expose the aromatic amino acids FVIII was incubated with guanidine hydrochloride, which acted as a chaotropic agent, prior to fluorescence measurement.

Data evaluation was made using a calibration curve of several dilutions of an in house standard lot with a known protein concentration.

For measurement of the protein content a PSA-rFVIII bulk drug substance containing 1000 IU rFVIII as determined by the chromogenic assay was dissolved in 2.5 mL water for injection (WFI). Then 1 mL of an aqueous 8M guanidine HCl solution was added. Then this solution was diluted with dilution buffer to obtain a FVIII concentration between 10 and 50 μg/mL.

This buffer was prepared as follows:

In a 1000 mL beaker, 0.24 g of Tris base, 1.31 g of sodium chloride, 0.06 g of calcium chloride dihydrate and 0.02 g of glutathione was dissolved in 900 mL WFI. 0.24 g of HEPES was added and a mixture of 0.03 g of Tween 80 were dissolved in 10 mL WFI. The pH was adjusted to 7.0 with 1N hydrochloric acid and then transferred to a 1000 mL volumetric flask with WFI water. Finally 8.00 g of mannitol and 2.00 g of trehalose were dissolved in 100 mL of this solution.

As a reference standard a rFVIII based on Takeda's recombinant full length rFVIII was used. For the reference curve standard point of 10, 20, 30, 40 and 50 μg/mL were prepared.

The fluorescence for each of samples A-F were measured in a spectrophotometer at 350 nm with excitation at 285 nm. All measurements were performed in duplicate.

Total rFVIII Protein Determination Results:

Total rFVIII Concentration for Samples A-F by the fluorescent assay are provided below in Table 3:

TABLE 3

| Sample | A | B | C | D | E | F |
|---|---|---|---|---|---|---|
| FVIII conc (mg/mL) | 1597 | 1715 | 1735 | 1717 | 1686 | 1689 |

Average Total rFVIII Protein Concentration of samples A-F was 1689.83 mg/mL.

Example B3: Classical Method—Determination of Total PSA Concentration Using the Resorcinol Assay Assay Principle The polysialylation degree in PSA-rFVIII can be calculated with the classical method by determination of the concentration of the bound PSA and the FVIII protein concentration. The amount of the bound PSA is determined by calculating the difference of total PSA and free PSA. Total PSA is measured by use of the resorcinol assay, free PSA is measured by use of a size exclusion chromatography HPLC method. The protein concentration is determined with a fluorescence method.

Determination of Total PSA

The resorcinol assay was performed as described by Svennerholm in 1957 (Biochimica et Biophysica Acta, 24, 604-611). For determination of the total PSA content in a preparation of polysialylated rFVIII (PSA-rFVIII) a reagent solution was prepared by mixing of a 20 mL aqueous resorcinol solution with 500 µL of an aqueous solution of $CuSO_4 \times 5 H_2O$ (concentration 0.1 M). Then 37% hydrochloric acid was added to get a final volume of 200 mL.

The measuring range of the assay was 10 µg/mL to 100 µg/mL. For the reference curve five different concentrations of NANA in $H_2O$ were prepared (10, 25, 50, 75, 100 µg/mL). 400 µL of each sample (PSA-rFVIII sample and reference sample) were intensively mixed with 400 µL of the resorcinol reagent. Then the samples were incubated in a thermomixer for 40 min at 99° C. and 450 rpm and cooled down for 10 minutes at a temperature of −15° C. or less. For extraction of the colored complex 800 µL of an organic extraction solution was added and intensively mixed. This solution was centrifuged at 13,000 rpm for 5 min. The upper organic phase was separated and transferred to a 1 mL cuvette. Then the extinctions were measured at 585 nm in a spectrophotometer and the concentration of total PSA was calculated from the reference curve. Measurements for each of samples A-F were performed in duplicate.

Total PSA Determination Results:

Total PSA Concentration for Samples A-F by the fluorescent assay are provided below in Table 4:

TABLE 4

| Sample | A | B | C | D | E | F |
|---|---|---|---|---|---|---|
| PSA conc (mg/mL) | 1.07 | 1.07 | 1.10 | 1.09 | 1.11 | 1.11 |

Average Total PSA Concentration of samples A-F was 1.09 mg/mL.

Example B4: Classical Method-Calculation of PSA Modification Degree for a PSA-rFVIII Conjugate Sample The PSA Modification Degree for a PSA-rFVIII conjugate is described using the formula:

$$PSA\ MD = \frac{n\ PSA}{n\ rFVIII} = \frac{[Total\ PSA]}{MW\ PSA} \times \frac{MW\ rFVIII}{[Total\ rFVIII]}$$

Based on the data obtained with the assays described above, and with the molecular weight of rFVIII as 280 kDa, and the molecular weight of PSA as 20 kDa, the PSA modification degree for the PSA-rFVIII conjugate for each of samples A-F is:

$$PSA\ MD = \frac{n\ PSA}{n\ rFVII} = \frac{[\_\_\_mg/mL]}{20,000\ Da} \times \frac{280,000\ Da}{[\_\_\_mg/mL]}$$

TABLE 5

| Sample | A | B | C | D | E | F |
|---|---|---|---|---|---|---|
| PSA Degree | 9.38 | 8.73 | 8.88 | 8.89 | 9.22 | 9.20 |

Average PSA modification degree for the PSA-rFVIII conjugate for samples A-F was 9.05.

Example B5: Determination of (Relative) Precision of Classical Method in Determining the PSA Modification Degree in PSA-rFVIII The robustness of the classical method was evaluated by measuring the resorcinol and the fluorescence value of 6 samples (A-F) from the same batch. Sample A and B were measured on Day 1, C and D were measured on Day 2, E and F were measured on Day 3.

SD/RSD Results for Total PSA Concentration:

The Standard Deviation (SD) and Relative Standard Deviation (RSD) was calculated for the Total PSA Concentration for Samples A-F. Standard Deviation (SD) was 0.02 mg/mL and Relative Standard Deviation (RSD) was 1.68%.

SD/RSD Results for Total rFVIII Protein Concentration:

The Standard Deviation (SD) and Relative Standard Deviation (RSD) was calculated for the Total rFVIII Protein Concentration for samples A-F. Standard Deviation (SD) was 49.08 mg/mL and Relative Standard Deviation (RSD) was 2.90%.

SD/RSD Results for PSA Modification Degree for PSA-rFVIII Conjugates:

The Standard Deviation (SD) and Relative Standard Deviation (RSD) was calculated for the PSA Modification Degree for PSA-rFVIII Conjugates for samples A-F. Standard Deviation (SD) was 0.25 mol PSA/mol FVIII and Relative Standard Deviation (RSD) was 2.78%.

Example B6: Q-NMR Method: Acquisition and Processing

Aqueous samples of PSA-rFVIII (0.5 mL, 0.8 mg/mL) in a 2 mL vial were defrosted by standing at RT over 30 min. The samples were transferred with a Pasteur pipette into 5 mm NMR tubes. 56 µL of $D_2O$ (99.9 atom % D) were added to each NMR tube and the content was homogenized by shaking the tube after sealing it with a polyethylene cap. Eventual bubbles must be removed by gentle knockings or short immersion in an ultra sound bath. The NMR tubes were cleaned and placed in a NMR spinner according to the spectrometer supplier's specifications.

Acquisition Parameters

The proton NMR spectra was acquired on a 600 MHz AVANCE BRUKER spectrometer as follow:
  Spectrometer Frequency: 600 MHz
  Pulse Program: zgesgp;
  Temperature (° C.): 25±5;
  Number of scans: 3000
  SW (ppm): >14 (approximately +10 to −4);
  Receiver Gain: optimize
  D1 (sec): 1

Processing Parameters

The proton-NMR spectra was processed using BRUKER Topspin software V3.5 as follows:
  Window functions: EM (Line broadening: 0.3 Hz);
  The following commands were executed:
  ft: Fourier transform
  apk: automatic phase correction
  abs: automatic baseline correction
  Axis calibration: Spectrum reference frequency was matched with a DSS SR value after calibration at 0.00 ppm of the methyl signal.

Example B7: $K_{NMR}$ Determination, Through Use of Alternate Assay a) Obtaining PSA MD for Samples 1-6 Via the Classical Method Samples of 6 PSA-rFVIII conjugates were analyzed. All PSA material mentioned in the documents refers to 20 kDa PSA chain material (about 69 polysialic acid units per chain). According to EXAMPLES B2-B4, the fluorescent assay coupled with the resorcinol assay was applied to each of the samples and revealed the following PSA Modification Degrees:

TABLE 6

| PSA MD according to Fluorescent/Resorcinol assay | Sample 1 | Sample 2 | Sample 3 | Sample 4 | Sample 5 | Sample 6 |
|---|---|---|---|---|---|---|
| PSA degree | 15.6 | 13.8 | 13.2 | 9.2 | 6.4 | 5.5 | b) Obtaining 'Crude' PSA MD for Samples 1-6 Via the Q-NMR Method

The numbers of Valine, Leucine and Isoleucine residues present on the protein rFVIII are multiplied by the numbers of first-type protons (signal: 1 ppm or less) they each contain. In the case of full length rFVIII:
  Valine: 125 residues×6 first-type protons=750 H
  Leucine: 222 residues×6 first-type protons=1332 H
  Isoleucine: 110 residues×7 first-type protons=770 H They are a total of 2852 first-type protons in this protein. The protein multiplet is integrated in the range 1.045 to 0.63 ppm using the integration command with automated baseline correction and the integral is calibrated at 2852.

The integral of the PSA $H_{3a}$ (equatorial) is set. This peak appears as a doublet. The center of the peak is determined (approximately 2.65 ppm) and the peak is integrated ±0.04 ppm on each side of the peak center using the integration command with automated baseline correction.

The value of this integral is multiplied by the molecular weight of one polymer unit and divided by the molecular weight of each PSA chain, which is equivalent of dividing by the average numbers of repeating units of each polymer chain. The crude PSA MD was determined:

TABLE 7

| Crude PSA MD according to Q-NMR | Sample 1 | Sample 2 | Sample 3 | Sample 4 | Sample 5 | Sample 6 |
|---|---|---|---|---|---|---|
| mol PSA/mol rFVIII | 18.85 | 18.63 | 17.48 | 12.61 | 8.15 | 7.25 | c) Calculating $K_{NMR}$ with Classical Method Data and Q-NMR Data

Next the ratio of Table 7 values/Table 6 values were calculated:

TABLE 8

| $K_{NMR}$ | Sample 1 | Sample 2 | Sample 3 | Sample 4 | Sample 5 | Sample 6 |
|---|---|---|---|---|---|---|
| Crude PSA MD according to NMR/PSA MD according to fluorescent/resorcinol assay | 1.21 | 1.35 | 1.32 | 1.37 | 1.27 | 1.32 |

The values in Table 8 are correcting factors for each batch, which are introduced in order for the PSA MD measured by NMR to be in accordance with the PSA MD measured by the classical method (fluorescent/resorcinol assay).

Averaging these correcting factors over the 6 samples (=over the MD 5.5 to 15.6) produces a $K_{NMR}$ of 1.31. The $K_{NMR}$ is specific for PSA-rFVIII conjugates with an MD of between 5.5 and 15.6.

The $K_{NMR}$ accounts for the heterogeneity of the protein as well as the overlap of peaks in the integration range.

d) SD/RSD Results for $K_{NMR}$:

Relative standard deviation of the $K_{NMR}$ over the MD 5.5 to 15.6 of the conjugate was estimated: RSD=4.1% (SD=0.05).

Example B8: Determining the Corrected MD for a PSA-rFVIII Conjugate Sample Via the Q-NMR Method In a later analysis experiment, a PSA-rFVIII conjugate sample was prepared according to Example B1.

Q-NMR analysis of this PSA-rFVIII conjugate sample was conducted as described in Example B6 and B7b). The crude PSA modification degree was determined to be =15.52.

The corrected PSA modification degree was obtained by dividing the crude PSA modification degree by $K_{NMR}$ obtained in Example B7c).

Corrected PSA modification degree 15.52/1.31=11.85

Example B9: Comparing the Q-NMR Results of Example B8 with Analysis of the Sample Via the Classical Method The PSA-rFVIII conjugate sample of Example B8 was subjected to the classical method (fluorescent/resorcinol assays) described in Examples B2-B5. The PSA MD was: PSA modification degree according to Fluorescence & Resorcinol assays=10.8

Example B10: Determination of (Relative) Precision of Q-NMR Method in Determining the PSA Modification Degree in a PSA-rFVIII Conjugate By the Classical Method, the PSA MD for the PSA-rFVIII Conjugate of Example B8 was determined to be 10.8 mol PSA/mol rFVIII.

By the Q-NMR Method, the corrected PSA MD for the PSA-rFVIII Conjugate of Example B8 was determined to be 11.85 mol PSA/mol rFVIII.

The Relative Precision of the Q-NMR Method in Determining the PSA Modification Degree in a PSA-FIX Conjugate is:

11.85/10.8=1.10

These results are in accordance ±10%.

Example B11

To illustrate the (relative) precision of the NMR method we prepared 6 samples from the same lot containing PSA-FVIII conjugate and performed the Acquisition and Processing parameters described in EXAMPLE B6 on them as well as the integration procedure described in Example B7.

This experiment revealed that the PSA Modification Degree of these 6 samples had a relative standard deviation (RSD) of less than 2%. The results are provided in the following table:

TABLE 9

| Sample 1 | Sample 2 | Sample 3 | Sample 4 | Sample 5 | Sample 6 | Mean | SD | RSD (%) |
|---|---|---|---|---|---|---|---|---|
| 11.05 | 11.21 | 10.87 | 10.83 | 11.19 | 11.24 | 11.07 | 0.16 | 1.48 |

The PSA Modification Degree according to the Q-NMR assay is: 11.1±0.2.

Example B12: Relative Precision of Example B11

Classical Method

This experiment (see Example B11) revealed that the PSA degree of 6 samples had a relative standard deviation (RSD) of 2.78%, as measured by the Classical Method.

Q-NMR Method

This experiment (see Example B11) revealed that the PSA degree of 6 samples had a relative standard deviation (RSD) of 1.48%, as measured by the Q-NMR method.

Example B13: Influence of the Spectrometer on the Q-NMR Measurement 2 identical NMR samples of PSA-rFVIII conjugates were prepared according to Example B1. 1 sample was sent to a NMR facility in Austria equipped with a Bruker 600 MHz spectrometer and the second sample was sent to a NMR facility in Germany equipped with a Bruker 600 MHz spectrometer. The Acquisition and Processing Parameters described in Example B6 were utilized here.

The PSA modification degrees were calculated.

Calculated PSA modification degree of the sample measured in Austria: 9.56

Calculated PSA modification degree of the sample measured in Germany: 9.25

The Relative Precision of the PSA modification degree of the sample measured in Austria and the sample measured in Germany is:

9.25/9.56=0.968

These results are in accordance ±<5%. The precision of the results obtained were independent of the spectrometer.

Example B14: Influence of the Number of Scans on the Q-NMR Measurement

A PSA-rFVIII conjugate sample was prepared according to Example B1. The NMR spectra of this sample (PSA-rFVIII concentration=0.8 mg/mL) was measured 3 times in a row utilizing the Acquisition and Processing Parameters described in Example B6. The first time utilized 3000 scans, the second time utilized 1500 scans and the third time utilized 16 scans.

The spectra were processed and the PSA modification degree was measured:

Calculated PSA modification degree of the sample with 3000 scans: 12.52

Calculated PSA modification degree of the sample with 1500 scans: 12.42

Calculated PSA modification degree of the sample with 16 scans: 11.80

The Relative Precision of the PSA modification degree of the sample with 16 scans and the sample measured with 3000 scans is:

11.80/12.52=0.942

Even with a low resolution (16 scans), reasonable correlation was achieved with the higher resolution spectra (3000 scans).

Example C1

Production of PEG-HSA Conjugate Used as a Reference Sample

HSA contains 60 lysine-residues, the more exposed residues can be chemically modified with a branched NHS PEG with a molecular weight of 20 kD to form an amide linkage.

Human albumin in 20 mM phosphate buffer pH 7 (MW 66.5 kD, 0.4813 µmol, 0.291 mL, 110 mg/mL protein concentration) was diluted with 50 mM phosphate buffer pH 7 (7.709 mL) and reacted with PEG-NHS solution in 2 mM hydrogen chloride (MW 20 kD, 4.813 µmol, 1 mL, 96 mg/mL PEG concentration) for 2 hours at ambient temperature. The coupling reaction was stopped by reacting the mixture with 1 M glycine solution (80 µL) for 1 hour at ambient temperature. To remove glycine, excessive PEG-NHS and free NHS the mixture (9 mL) was dialyzed for 5 days at ambient temperature against 20 mM phosphate buffer pH 7 (2 L, buffer exchange after 3 and 4 days) employing a Float-A-Lyzer G2 Dialysis Device (Spectrum Laboratories; MWCO 50 kD, 10 mL) follow by dialyse (8 days) at ambient temperature against 20 mM phosphate buffer pH 7 (2 L, buffer exchange after 1, 2 and 4 days)

employing a Float-A-Lyzer G2 Dialysis Device (Spectrum Laboratories; MWCO 100 kD, 10 mL) to yield a clear colorless product solution. The clear colorless product solution was then directly used for classical method testing or NMR method testing.

Example C2: Classical Method—Determination of Total HSA Concentration Using Nephelometry Nephelometry is a method used for the immunochemical determination of proteins in complex biological mixtures including plasma, serum, urine and other body fluids. Upon mixing an antigen solution with a corresponding antibody solution, immune complexes are formed, and the solution becomes turbid. Nephelometry measures the turbidity of the solution by the reduction in the intensity of a light beam scattered by these immune complexes. Using defined conditions, the intensity of the scattered light is proportional to the amount of the immune complex in the solution. The following procedure is carried out by the BN ProSpec nephelometer according to the BN ProSpec instruction manual [BN ProSpec instruction manual, Siemens. Version 1.2, Ausgabedatum 2005/05]. Total HSA concentration was determined to be 1.16 mg/mL.

Example C3: Classical Method—Determination of Total PEG Concentration Using HPLC PEG concentration in HSA samples is measured by use of an Agilent HPLC 1200 system equipped with an evaporated light scattering detector (ELSD) and an Onyx Monolith C18 column (4.6×100 mm). Before the analysis of the samples by HPLC the protein of the PEG-rFVIII in Adynovate is digested enzymatically with pronase K and reduced with dithiotreitol (DTT). Then, 100 µL sample (PEG concentrations 3-45 µg/mL) are injected and analyzed using the following separation conditions: Eluent A: 0.1% TFA in $H_2O$; Eluent B: 0.1% TFA in $CH_3CN$.
Gradient: 0 min 25% B; 6 min 65% B; 6.1 min 25 B; 9 min 25% B.
Flow rate: 2 mL/min.
For the reference curve different concentrations of a PEG standard (PEG concentrations: 3-45 µg/mL) are used. The ELSD signals are integrated. The concentration of total PEG is calculated from the reference curve between the common logarithm of the concentrations and the common logarithm of the peak areas of the calibration standards.
The total PEG concentration was determined to be 0.630 mg/mL.

Example C4: Classical Method—Calculation of PEG Modification Degree for a PEG-HSA Conjugate Based on the data obtained with the assays described above, and with the molecular weight of albumin as 66.5 kDa, and the molecular weight of PEG as 20 kDa, the PEG modification degree on HSA is:

$$PEG\ MD = \frac{n\ PEG}{n\ HSA} = \frac{[Total\ PEG]}{MW\ PEG} \times \frac{MW\ \text{albumin}}{[Total\ HSA]}$$

$$PEG\ MD = \frac{n\ PEG}{n\ HSA} = \frac{0.630}{20000} \times \frac{66500}{1.16}$$

By the Classical Method, the PEG modification degree on albumin for the reference sample was determined to be 1.81 mol PEG/mol HSA.

Example C5

HSA contains 60 Lysine-residues, the more exposed residues can be chemically modified with a branched NHS PEG with a molecular weight of 20 kD to form an amide linkage.
Human albumin in 20 mM phosphate buffer pH 7 (MW 66.5 kD, 0.4813 µmol, 0.291 mL, 110 mg/mL protein concentration) was diluted with 50 mM phosphate buffer pH 7 (7.709 mL) and reacted with PEG-NHS solution in 2 mM hydrogen chloride (MW 20 kD, 9.626 µmol, 1 mL, 192 mg/mL PEG concentration) for 2 hours at ambient temperature. The coupling reaction was stopped by reacting the mixture with 1 M glycine solution (80 µL) for 1 hour at ambient temperature. To remove glycine, excessive PEG-NHS and free NHS the mixture (9 mL) was dialyzed for 5 days at ambient temperature against 20 mM phosphate buffer pH 7 (2 L, buffer exchange after 3 and 4 days) employing a Float-A-Lyzer G2 Dialysis Device (Spectrum Laboratories; MWCO 50 kD, 10 mL) follow by dialyse (8 days) at ambient temperature against 20 mM phosphate buffer pH 7 (2 L, buffer exchange after 1, 2 and 4 days) employing a Float-A-Lyzer G2 Dialysis Device (Spectrum Laboratories; MWCO 100 kD, 10 mL) to yield a clear colorless product solution with a protein concentration of 1.83 mg/mL. The protein concentration was determined by nephelometric measurement (Siemens Healthcare Diagnostics GmbHmore Info)

Example C6: Q-NMR Method: Acquisition and Processing

Preparation of the Sample Containing the Conjugate and Q-NMR Acquisition/Processing Analysis
An aqueous sample of PEG-HSA (0.5 mL, 0.5-5 mg/mL) in a 2 mL vial was defrosted by standing at RT over 30 min. The sample was transferred with a Pasteur pipette into a 5 mm NMR tube. 56 µL of $D_2O$ (99.9 atom % D) were added to the NMR tube and the content was homogenized by shaking the tube after sealing it with a polyethylene cap. Eventual bubbles must be removed by gentle knockings or short immersion in an ultra sound bath. The NMR tube was cleaned and placed in a NMR spinner according to the spectrometer supplier's specifications.
Acquisition Parameters
The proton NMR spectra was acquired on a 600 MHz AVANCE BRUKER spectrometer as follow:
Spectrometer Frequency: 600 MHz
Pulse Program: zgesgp;
Temperature (° C.): 25±5;
Number of scans: 3000
SW (ppm): >14 (approximately +10 to −4);
Receiver Gain: optimize
D1 (sec): 1
Processing Parameters
The proton-NMR spectra was processed using BRUKER Topspin software V3.5 as follows:
Window functions: EM (Line broadening: 0.3 Hz);
The following commands were executed:
ft: Fourier transform
apk: automatic phase correction
abs: automatic baseline correction Axis calibration: Spectrum reference frequency was matched with a DSS SR value after calibration at 0.00 ppm of the methyl signal.

Example C7: $K_{NMR}$ Determination

Method of Determination of $K_{NMR}$ of PEG-HSA Conjugates

This method is useful when one sample is available for which the value is known by the classical method. A PEG-HSA conjugate sample of known PEG modification degree can be used to determine $K_{NMR}$. In Example C4, the PEG modification degree was determined by the classical method to be 1.81 mol PEG/mol HSA.

According to EXAMPLE C6, the proton NMR spectrum of the reference sample was acquired and processed.

The numbers of Valine, Leucine and Isoleucine residues present in the HSA are multiplied by the numbers of first-type protons (signal: 1 ppm or less) they each contain.

In the case of HSA:
Valine: 43 residues×6 first-type protons=258H
Leucine: 64 residues×6 first-type protons=384 H
Isoleucine: 9 residues×7 first-type protons=63H They are a total of 705 first-type protons in this protein. The protein multiplet is integrated in the range of approximately 0.89 to 0.5 ppm using the integration command with automated baseline correction and the integral is calibrated at the value of 705.

The integral of the PEG signal is set. This peak appears as a singlet. The center of the peak is determined (3.555 ppm) and the peak is integrated ±0.01 ppm on each side of the peak center using the integration command with automated baseline correction. An integral of 100114 protons was obtained.

The value of this integral is divided by the average number of $CH_2$ PEG protons present in each ethylene glycol unit (4 protons)

20000 g/mol/44 g/mol=455 PEG units per 20 kDa PEG chain

455 PEG units per PEG reagent×4 protons per ethylene glycol unit=1820 H

There are, on average, 1820 $CH_2$ protons per 20 kDa PEG chain.

$$100114/1820=55.0$$

The result is then divided by the known PEG modification degree of the reference sample. Thus we obtain the $K_{NMR}$ for this conjugate.

$$55.03/1.81=30.4$$

The $K_{NMR}$ for the PEG-HSA conjugate is 30.4.

Example C8: Q-NMR Modification Degree

Q-NMR Determination of the PEG Modification Degree on a PEG-HSA Conjugate

The PEG MD of an unknown PEG-HSA sample was determined by use of Q-NMR technology. The sample was prepared according to Example C5.

According to EXAMPLE C6, the proton NMR spectrum was acquired and processed. The PEG peak was centered at 3.555 ppm (like the reference spectra)

The numbers of Valine, Leucine and Isoleucine residues present in the rFVIII are multiplied by the numbers of first-type protons (signal: 1 ppm or less) they each contain.

In the case of HSA:
Valine: 43 residues×6 first-type protons=258H
Leucine: 64 residues×6 first-type protons=384H
Isoleucine: 9 residues×7 first-type protons=63H They are a total of 705 first-type protons in this protein. The protein multiplet is integrated in the range of approximately 0.89 to 0.5 ppm (like the reference spectra) using the integration command with automated baseline correction and the integral is calibrated at the value of 705.

The integral of the PEG signal is set. This peak appears as a singlet. The center of the peak is set at 3.555 ppm and the peak is integrated ±0.01 ppm on each side of the peak center using the integration command with automated baseline correction.

An integration value for the PEG peak was obtained of 117876 H.

The value of this integral was divided by the average number of $CH_2$ PEG protons present in each PEG chain units. The result was then divided by the NMR factor ($K_{NMR}$), of this conjugate (see EXAMPLE C7), which accounts for the heterogeneity of the protein as well as the overlap of peaks in the integration range. The result obtained is the PEG Modification Degree for the PEG-HSA conjugates in the unknown sample.

$$117876/(1820\times30.4)=2.13$$

According to the NMR method the PEG Modification Degree for the PEG-HSA conjugates in the unknown sample is 2.13.

With the MD determined for a sample using the NMR method, we can confirm this result is the same as one obtainable with the classical method.

Calculation of PEGylation Degree in the Unknown Sample PEG-Albumin Using the Classical Method The PEG concentration of the unknown sample was determined using RP-HPLC/ELSD to be 1.22 mg PEG/mL.

Based on the data obtained with the assays the PEGylation degree of HSA is calculated using the same calculation scheme as listed for the PSA-rFVIII in Example B2.

$$PEG\ MD = \frac{n\ PEG}{n\ \text{albumin}} = \frac{[\text{Total}\ PEG]}{MW\ PEG} \times \frac{MW\ \text{albumin}}{[\text{Total Protein}]}$$

MW PEG reagent: 20 kDa
MW albumin=66.5 kDa
Protein concentration=1.83 mg/mL
PEG MD=2.22

$$PEG\ MD = \frac{n\ PEG}{n\ \text{albumin}} = \frac{1.22}{20000} \times \frac{66500}{1.83}$$

The PEG degree of the unknown sample (PEG-Albumin) according to the classical method is 2.22 PEG chain per protein molecule. This is in accordance with the value obtained according to the NMR method.

Example C9: Determination of (Relative) Precision of Q-NMR Method in Determining the PEG Modification Degree in a PEG-HSA Conjugate By the Classical Method, the PEG modification degree for the PEG-HSA Conjugate for the unknown sample was determined to be 2.22 mol PEG/mol HSA.

By the Q-NMR Method, the PEG modification degree for the PEG-HSA Conjugate for the unknown sample was determined to be 2.13 mol PEG/mol HSA.

The Relative Precision of the Q-NMR Method in Determining the PEG Modification Degree in a PEG-HSA Conjugate is:

2.13/2.22=0.96

These results are in accordance ±5%.

Example D1: Determination of PEG Modification Degree for a PEG-rFVIII Conjugate Sample Production of PEG-rFVIII Conjugate An aqueous sample of PEG-rFVIII in a vial can be defrosted by standing at RT over 30 min. The sample can be transferred with a Pasteur pipette into a 5 mm NMR tube. $D_2O$ (99.9 atom % D) can be added to the NMR tube and the content can be homogenized by shaking the tube after sealing it with a polyethylene cap. Eventual bubbles can be removed by gentle knockings or short immersion in an ultra sound bath. The NMR tube can be cleaned and placed in a NMR spinner according to the spectrometer supplier's specifications.

Q-NMR Acquisition Parameters

The proton NMR spectra can be acquired on a 600 MHz AVANCE BRUKER spectrometer as follows:
  Spectrometer Frequency: 600 MHz
  Pulse Program: zgesgp;
  Temperature (° C.): 25±5;
  Number of scans: 3000
  SW (ppm): >14 (approximately +10 to −4);
  Receiver Gain: optimize
  D1 (sec): 1

Q-NMR Processing Parameters

The proton-NMR spectra can be processed using BRUKER Topspin software V3.5 as follows:
  Window functions: EM (Line broadening: 0.3 Hz);
  The following commands can be executed:
  ft: Fourier transform
  apk: automatic phase correction
  abs: automatic baseline correction
  Axis calibration: Spectrum reference frequency can be matched with a DSS SR value after calibration at 0.00 ppm of the methyl signal.

Example D2: Classical Method—Determination of Total rFVIII Concentration Using the Fluorescence Method The PEG modification degree for a PEG-rFVIII conjugate can be calculated with the classical method by determination of the concentration of the bound PEG and the FVIII protein concentration. The protein concentration is determined with a fluorescence method.

Example D3: Classical Method—Determination of Bound PEG Concentration Using HPLC Assay Principle The PEG modification degree for a PEG-rFVIII conjugate can be calculated with the classical method by determination of the concentration of the PEG and the FVIII protein concentration. This procedure is similar to the determination of the PEG concentration in Example C and determination of FVIII in in Example B. Both parameters are determined by use of RP HPLC methods.

Determination of Total PEG

Total PEG for a PEG-rFVIII conjugate sample is measured by use of an Agilent HPLC 1200 system equipped with an evaporated light scattering detector (ELSD) and an Onyx Monolith C18 column (4.6×100 mm). Before the analysis of the samples by HPLC the rFVIII of the PEG-rFVIII conjugate is digested enzymatically with pronase K and reduced with dithiotreitol (DTT). Then, 100 μL sample (PEG concentrations 3-45 μg/mL) are injected and analyzed using the following separation conditions:
  Eluent A: 0.1% TFA in $H_2O$; Eluent B: 0.1% TFA in $CH_3CN$.
  Gradient: 0 min 25% B; 6 min 65% B; 6.1 min 25 B; 9 min 25% B.
  Flow rate: 2 mL/min.

For the reference curve different concentrations of a PEG standard (PEG concentrations: 3-45 μg/mL) are used. The ELSD signals are integrated. The concentration of total PEG is calculated from the reference curve between the common logarithm of the concentrations and the common logarithm of the peak areas of the calibration standards.

Calculation of PEGylation Degree in Adynovate (Registered Trademark)

Based on the data obtained with the assays described above the PEGylation degree of Adynovate (registered trademark) is calculated using the same calculation scheme as listed for the PSA-rFVIII in Example C.

For determination of $K_{NMR}$ an Adynovate (registered trademark) sample of known PEG degree is set as a standard reference for the measurement of other PEG-rFVIII conjugates.

The proton NMR spectrum of a reference sample was acquired and processed as described above.

The numbers of Valine, Leucine and Isoleucine residues present in the rFVIII are multiplied by the numbers of first-type protons (signal: 1 ppm or less) they each contain. In the case of full length rFVIII:
  Valine: 125 residues×6 first-type protons=750 H
  Leucine: 222 residues×6 first-type protons=1332 H
  Isoleucine: 110 residues×7 first-type protons=770 H They are a total of 2852 first-type protons in this protein. The protein multiplet is integrated in the range of approximately 1.05 to 0.6 ppm (depending of the resolution of the peak) using the integration command with automated base-line correction and the integral is calibrated at the value of 2852.

The integral of the PEG signal is set. This peak appears as a singlet. The center of the peak is determined (approximately 3.67 ppm) and the peak is integrated ±0.01 ppm on each side of the peak center using the integration command with automated baseline correction.

The value of this integral is divided by the average numbers of $CH_2$ PEG protons present in each PEG chain units, the results is then divided by the known PEG degree of the reference sample. Thus we obtain the $K_{NMR}$ for this conjugate.

Q-NMR Determination of the PEG Modification Degree on Adynovate (Registered Trademark) Sample The numbers of Valine, Leucine and Isoleucine residues present in the rFVIII are multiplied by the numbers of first-type protons (signal: 1 ppm or less) they each contain. In the case of full length rFVIII:
  Valine: 125 residues×6 first-type protons=750 H
  Leucine: 222 residues×6 first-type protons=1332 H
  Isoleucine: 110 residues×7 first-type protons=770 H They are a total of 2852 first-type protons in this protein. The protein multiplet is integrated in the range of approximately 1.05 to 0.6 ppm (depending of the resolution of the peak) using the integration command with automated baseline correction and the integral is calibrated at the value of 2852.

The integral of the PEG signal is set. This peak appears as a singlet. The center of the peak is determined (approximately 3.67 ppm) and the peak is integrated ±0.01 ppm on each side of the peak center using the integration command with automated baseline correction.

The value of this integral is divided by the average numbers of $CH_2$ PEG protons present in each PEG chain units, the results is then divided by the NMR factor ($K_{NMR}$), of this conjugate, which accounts for the heterogeneity of the protein as well as the overlap of peaks in the integration range. The result obtained is the Modification Degree of PEG on full length rFVIII.

Example E: MD Determination in PEGylated BPTI

Preparation of PEGylated BPTI

For PEGylation of bovine pancreatic trypsin inhibitor (BPTI or aprotinin/Ascenzi et al., Curr. Protein Pept. Sci. 2003, 4, 231-251) a $MS(PEG)_4$ Methyl-PEG-NHS-Ester reagent from Thermofisher Scientific is used. This PEG reagent has a short PEG chain with 4 units and contains a terminal NHS-ester for modification of lysine residues to form a stable amide bond. In addition, it contains a terminal methoxy group end-cap. The PEGylation of BPTI using NHS technology is described in U.S. Pat. No. 7,550,427 B2 and CN 101412995 B.

Recombinant BPTI is purchased from Sigma-Aldrich (Saint Louis, MO, USA). A solution of BPTI (1 mg/mL) in 20 mM Hepes buffer pH 7.4 containing 150 mM NaCl is prepared. The PEGylation reaction is performed for 1 h at room temperature with a 40 mM excess in relation to the number of lysine residues (5 Lys). Then the reaction is stopped by the addition of glycine (final concentration: 100 mM). Finally, the conjugate is purified by cation-exchange chromatography on SP-Sepharose FF (GE-Healthcare) in 50 mM phosphate buffer pH 7.2. The reaction mixture is subjected to the column which is subsequently flushed with 5 CV phosphate buffer, pH 7.2. The conjugate is eluted from the column using a linear gradient from 0-0.8 M NaCl. The conjugate containing fractions are concentrated by UF/DF employing Vivaspin 2 devices (Sigma-Aldrich, Saint Louis, MO, USA) made of polyethersulfone with a molecular weight cut-off of 3 kDa.

Determination of the PEG-Modification Degree on a PEG-BPTI Conjugate by Q-NMR

The $^1$H NMR spectrum of BPTI has been published by Masson and Wuthrich (FEBS Letters 1973, 31, 114-118).

The numbers of Valine, Leucine and Isoleucine residues present on the proteins are multiplied by the numbers of first-type protons (signal: 1 ppm or less) they each contain. In the case of BPTI:

Valine: 1 residue×6 first-type protons=6 H
Leucine: 2 residues×6 first-type protons=12 H
Isoleucine: 2 residues×7 first-type protons=14 H They are a total of 32 first-type protons in this protein. The protein multiplet is integrated in the range of approximately 1.05 to 0.6 ppm (depending of the resolution of the peak) using the integration command with automated baseline correction and the integral is calibrated at the value 32. If another peak interferes for the integration, the closet baseline point is used.

The integral of the PEG is set. This peak appears as a singlet. The center of the peak is determined (approximately 3.67 ppm) and the peak is integrated ±0.01 ppm on each side of the peak center using the integration command with automated baseline correction.

The value of this integral is divided by the average numbers of $CH_2$ PEG protons present in each PEG chain. The quotient is then divided by the NMR factor ($K_{NMR}$), which accounts for the heterogeneity of the protein as well as the overlap of peaks in the integration range. This factor can be calculated from data of the modification degree as measured by MALDI-TOF (matrix-assisted laser desorption ionization time of flight) Mass Spectrometry. This is outlined in U.S. Pat. No. 7,550,427 B2.

The result obtained is the Modification Degree of PEG on BPTI determined by $^1$H NMR spectroscopy.

Example F: MD Determination in PEGylated FIX

Human coagulation factor IX is a serine protease, which is consisting of 461 amino acids with a molecular weight of 57 kDa. Its structure consists of a Gla domain, an EGF-domain, an activation peptide as well as a catalytic domain. The activation peptide is containing N-glycans (Makino et al., J. Biochem. 2000,128(2):175-180), which can be selectively PEGylated using the same approach as described for PSA-rFVIII in Example B (reaction of FVIII with aminooxy PSA). For this purpose a 20 kDa aminooxy reagent (Sunbright GL2-200CA) from NOF (NOF Corporation, Tokyo, Japan) is used and recombinant Factor IX is PEGylated via its N-glycans as described in U.S. Pat. No. 8,642,737 B2.

The $^1$H NMR spectrum of Factor IX has been published by Freedman et al. (J. Biol. Chem 1995, 270(14), 7980-7987).

The numbers of Valine, Leucine and Isoleucine residues present on the proteins are multiplied by the numbers of first-type protons (signal: 1 ppm or less) they each contain. The protein multiplet is integrated in the range of approximately 1.05 to 0.6 ppm (depending of the resolution of the peak) using the integration command with automated baseline correction and the integral is calibrated. If another peak interferes for the integration, the closet baseline point is used. The integral of the PEG is set. This peak appears as a singlet. The center of the peak is determined (approximately 3.67 ppm) and the peak is integrated ±0.01 ppm on each side of the peak center using the integration command with automated baseline correction.

The value of this integral is divided by the average numbers of $CH_2$ PEG protons present in each PEG chain. The quotient is then divided by the NMR factor ($K_{NMR}$), which accounts for the heterogeneity of the protein as well as the overlap of peaks in the integration range. This factor can be calculated from data of the modification degree as measured by a classical method (e.g. HPLC method as described for PSA-rFVIII in Example B).

The result obtained is the Modification Degree of PEG on coagulation factor IX determined by $^1$H NMR spectroscopy.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. A method for determining the average number of first polymers covalently attached to protein-first polymer conjugates in a solution, comprising:
   a) performing a $^1$H nuclear magnetic resonance measurement on the solution comprising the protein-first polymer conjugates;
   b) processing said $^1$H nuclear magnetic resonance measurement;
   c) integrating said $^1$H nuclear magnetic resonance measurement at a first-type proton peak, wherein said first-type proton peak comprises a signal generated by at least one proton on the side chain of at least one amino acid in the protein-first polymer conjugates;
   d) calibrating said result of c);
   e) integrating said $^1$H nuclear magnetic resonance measurement at a second-type proton peak, wherein said second-type proton peak comprises a signal generated by at least one proton in the first polymers;
   f) dividing the result of e) by the number of second-type protons per monomer of the first polymer;
   g) dividing the result of f) by the average number of monomers in the first polymer,
   thereby determining the average number of the first polymers covalently attached to the protein-first polymer conjugates in the solution.

2. The method of claim 1, further comprising, dividing the result of e) or f) or g) by $K_{NMR}$, wherein said $K_{NMR}$ is obtained from a standard reference or a calibration curve or an alternate assay.

3. The method of claim 1, wherein
said calibrating comprises equating said result of c) with the number of first-type protons in the protein-first polymer conjugate.

4. The method of claim 1, wherein
said c) integrating is fixed; and
said e) integrating is fixed.

5. The method of claim 1, wherein
said c) integrating is centered around the first-type proton peak; and
said e) integrating is centered around the second-type proton peak.

6. The method of claim 1, wherein
said b) comprises processing said $^1$H nuclear magnetic resonance measurement:
with Fourier transform;
with automatic phase correction;
with automatic baseline correction;
with a line broadening window function of from about 0.01 to 10 Hz;
with an exponential methods window function; and
with a DSS axis calibration.

7. The method of claim 1, wherein
said a) comprises performing said $^1$H nuclear magnetic resonance measurement:
with a temperature of between about 15° C. and 35° C.;
with from about 16 to about 10,000 scans;
with a spectral width of from about +10 ppm to about −4 ppm;
with a recycle delay of from about 0.1 seconds to about 120 seconds; and
with an optimized receiver gain.

8. The method of claim 1, wherein said first-type proton peak consists essentially of signals generated by the at least one proton on the side chain of the at least one amino acid in the protein-first polymer conjugates.

9. The method of claim 1, wherein said first-type proton peak comprises signals generated by the 6 protons on the methyl groups of valine and the 6 protons on the methyl groups of leucine and the 6 protons on the methyl groups of isoleucine and the proton on the methine group of isoleucine.

10. The method of claim 1, wherein said first-type proton peak consists essentially of signals generated by the 6 protons on the methyl groups of valine and the 6 protons on the methyl groups of leucine and the 6 protons on the methyl groups of isoleucine and the proton on the methine group of isoleucine.

11. The method of claim 1, wherein said first-type proton peak is on an amino acid of a protein with blood coagulation biological activity.

12. The method of claim 11, wherein said protein is selected from the group consisting of Factor VII, Factor VIIa, Factor VIII, Factor IX, and von Willebrand Factor (VWF).

13. The method of claim 12, wherein said protein is Factor VIII.

14. The method of claim 1, wherein said first-type proton peak is on an amino acid of a protein with human serum albumin biological activity or bovine pancreatic trypsin inhibitor biological activity.

15. The method of claim 1, wherein said second-type proton peak consists essentially of signals generated by at least one proton in the first polymers.

16. The method of claim 1, wherein said first polymer in said protein-first polymer conjugate is polysialic acid, and said second-type proton peak is generated from an $H_{3a}$ proton on a sialic acid monomer in said polysialic acid.

17. The method of claim 1, wherein said first polymer is a water-soluble polymer.

18. The method of claim 1, wherein said first polymer is a polyalkylene glycol or a polycarbohydrate.

19. The method of claim 18, wherein said first polymer is a polyalkylene glycol, and said polyalkylene oxide is a polyethylene glycol.

20. The method of claim 18, wherein said first polymer is a polycarbohydrate, and said polycarbohydrate is a polysialic acid.

21. A method for determining the average number of polysialic acid polymers covalently attached to Factor VIII-polysialic acid conjugates in a solution, comprising:
   a) performing a $^1$H nuclear magnetic resonance measurement on the solution comprising the Factor VIII-polysialic acid conjugates:
   with a temperature of between about 15° C. and 35° C.;
   with from about 16 to about 10,000 scans;
   with a spectral width of from about +10 ppm to about −4 ppm;
   with a recycle delay of from about 0.1 seconds to about 120 seconds; and
   with an optimized receiver gain;
   b) processing said $^1$H nuclear magnetic resonance measurement:
   with Fourier transform;
   with automatic phase correction;
   with automatic baseline correction;
   with a line broadening window function of 0.3 Hz;
   with an exponential methods window function; and
   with a DSS axis calibration;
   c) center integrating said $^1$H nuclear magnetic resonance measurement at a first-type proton peak consisting essentially of signals generated by the 6 protons on the methyl groups of valine and the 6 protons on the methyl groups of leucine and the 6 protons on the methyl groups of isoleucine and the proton on the methine group of isoleucine;

d) calibrating the result of c);

e) center integrating said $^1$H nuclear magnetic resonance measurement at a second-type proton peak consisting essentially of signals generated from an $H_{3a}$ proton on a sialic acid monomer in said polysialic acid polymers;

f) dividing the result of e) by 1;

g) dividing the result of f) by the average number of monomers in the polysialic acid polymers, and dividing the result of step g) by $K_{NMR}$, wherein said $K_{NMR}$ is obtained from a standard reference or a calibration curve or an alternate assay.

* * * * *